(12) United States Patent
Po et al.

(10) Patent No.: US 8,019,804 B2
(45) Date of Patent: Sep. 13, 2011

(54) METHOD AND APPARATUS FOR CALCULATING AN SSD AND ENCODING A VIDEO SIGNAL

(75) Inventors: Lai-Man Po, Tsing Yi (HK); Kai Guo, Kowloon Tong (HK)

(73) Assignee: City University of Hong Kong, Kowloon (HK)

( * ) Notice: Subject to any disclaimer, the term of this patent is extended or adjusted under 35 U.S.C. 154(b) by 1205 days.

(21) Appl. No.: 11/690,891

(22) Filed: Mar. 26, 2007

(65) Prior Publication Data
US 2008/0243971 A1 Oct. 2, 2008

(51) Int. Cl.
*G06F 17/14* (2006.01)
*H04N 7/12* (2006.01)

(52) U.S. Cl. ............... 708/402; 375/240.02; 375/240.12

(58) Field of Classification Search .............. 708/490, 708/200, 495, 401, 402; 375/240.02, 240.12
See application file for complete search history.

(56) References Cited

U.S. PATENT DOCUMENTS

| | | | | |
|---|---|---|---|---|
| 5,295,077 A * | 3/1994 | Fukuoka | ....................... | 708/402 |
| 5,590,064 A * | 12/1996 | Astle | ........................... | 708/203 |
| 5,983,251 A * | 11/1999 | Martens et al. | ............... | 708/203 |
| 6,366,614 B1 | 4/2002 | Pian et al. | | |
| 6,430,222 B1 * | 8/2002 | Okada | ........................... | 708/203 |
| 6,507,614 B1 * | 1/2003 | Li | ................................ | 708/402 |
| 6,882,685 B2 | 4/2005 | Malvar | | |
| 6,968,090 B2 * | 11/2005 | Yokose | ........................... | 382/251 |
| 6,975,680 B2 | 12/2005 | Demos | | |
| 7,106,797 B2 | 9/2006 | Malvar | | |
| 2001/0050959 A1 * | 12/2001 | Nishio et al. | ................... | 375/243 |
| 2004/0095997 A1 | 5/2004 | Altunbasak et al. | | |
| 2007/0162236 A1 * | 7/2007 | Lamblin et al. | ............... | 708/235 |
| 2007/0183500 A1 * | 8/2007 | Nagaraj et al. | ........... | 375/240.16 |
| 2008/0037642 A1 * | 2/2008 | Tsuchiya et al. | ......... | 375/240.16 |

OTHER PUBLICATIONS

Wiegand, T., et al., "Overview of the H.264/AVC Video Coding Standard," IEEE Trans. Circuits Syst. Video Technol., vol. 13, No. 7, pp. 560-576, Jul. 2003.
Wiegand, T., et al., "Rate-Distortion Optimized Mode Selection for Very Low Bit Rate Video Coding and the Emerging H.263 Standard," IEEE Trans. Circuits Syst. Video Technol., vol. 6, No. 2, pp. 182-190, Apr. 1996.
Sullivan, G. J., et al., "Rate-Distortion Optimization for Video Compression," IEEE Signal Process. Mag., vol. 15, pp. 74-90, Nov. 1998.
Wiegand, T., et al., "Rate-Constrained Coder Control and Comparison of Video Coding Standards," IEEE Trans. Circuits Syst. Video Technol., vol. 13, No. 7, pp. 688-703, Jul. 2003.

(Continued)

*Primary Examiner* — Chuong D Ngo
(74) *Attorney, Agent, or Firm* — Stites & Harbison PLLC; Douglas E. Jackson

(57) ABSTRACT

The present invention relates to a method and apparatus for calculating the Sum of Squared Differences (SSD) between a source block and a reconstructed block of image or video data encoding according to an encoding scheme such as H.264/AVC. In a preferred embodiment, the method computes the SSD by finding the SSD between coefficients of an integer transformed residual block and the corresponding inverse-quantized coefficients. Preferably the inverse quantized coefficients are found with the aid of a look up table. This method may save computing time and processing power compared to calculating the SSD directly from the source and reconstructed blocks. The SSD is related to the distortion caused by encoding and the method may be used in calculating the rate-distortion of a particular encoding mode. One embodiment of the invention encodes a block of data by selecting the encoding mode with the least rate-distortion.

21 Claims, 12 Drawing Sheets

OTHER PUBLICATIONS

Tu, Y. K., et al., "Efficient Rate-Distortion Estimation for H.264/AVC Coders," IEEE Trans. Circuits Syst. Video Technol. vol. 16, No. 5, pp. 600-611, May 2006.

Tourapis, A. M., et al., *Revised H.264/MPEG-4 AVC Reference Software Manual*, FastVDO LLC, Fraunhofer-Institute HHI, Microsoft Corporation, 63 pp., Oct. 2005.

Fan, C. P., et al., "Fast Center Weighted Hadamard Transform Algorithms," IEEE Trans. Circuits Syst.—Part II: Analog and Digital Signal Processing, vol. 45, No. 3, pp. 429-432, Mar. 1998.

Fan, C. P., et al., "Fixed-Pipeline Two-Dimensional Hadamard Transform Algorithms," IEEE Trans. on Signal Process., vol. 45, No. 6, pp. 1669-1674, Jun. 1997.

Hallapuro, A., et al., "Low Complexity Transform and Quantization—Part I: Basic Implementation," in Joint Video Team (JVT) of ISO/IEC MPEG and ITU-T VCEG, Doc. JVT-B038, 18 pp., Jan. 2002.

Chen, Q., et al., "A Fast Bits Estimation Method for Rate-Distortion Optimization in H.164/AVC," in Proc. Picture Coding Syst. (PCS 2004), Paper No. 35, 5 pp. Dec. 2004.

Côté, G., et al., "H.263+: Video Coding at Low Bit Rates," IEEE Trans. Circuits Syst. Video Technol. vol. 8, No. 7, pp. 849-866, Nov. 1998.

Sullivan, G. J., et al., "Video Compression—From Concepts to the H.264/AVC Standard," Proceedings of the IEEE, vol. 93, No. 1, pp. 18-31, Jan. 2005.

Marpe, D., et al., "Context-Based Adaptive Binary Arithmetic Coding in the H.264/AVC Video Compression Standard," IEEE Trans. Circuits Syst. Video Technol. vol. 13, No. 7, pp. 620-636, Jul. 2003.

* cited by examiner

Fig. 1: H.264 Rate-distortion performance comparison using RDO-based, SAD-based and SATD-based cost functions in terms of PSNR (dB) and Rate (Kbps)

| Seq. | QP | 28 | | | 32 | | | 36 | | | 40 | | |
|---|---|---|---|---|---|---|---|---|---|---|---|---|---|
| | | RDO | SAD | SATD | RDO | SAD | SATD | RDO | SAD | SATD | RDO | SAD | SATD |
| Akiyo | PSNR | 39.94 | 39.76 | 39.81 | 36.95 | 36.86 | 36.88 | 34.30 | 34.04 | 34.12 | 31.43 | 31.36 | 31.40 |
| | Rate | 218.09 | 225.16 | 221.64 | 154.03 | 160.47 | 157.54 | 111.77 | 114.78 | 112.64 | 80.78 | 82.85 | 80.86 |
| Foreman | PSNR | 37.84 | 37.65 | 37.68 | 34.90 | 34.54 | 34.72 | 32.40 | 32.26 | 32.29 | 29.69 | 29.46 | 29.62 |
| | Rate | 421.58 | 432.09 | 427.49 | 251.64 | 258.36 | 260.21 | 163.58 | 168.57 | 166.71 | 110.09 | 112.21 | 114.62 |
| Stefan | PSNR | 37.16 | 36.85 | 36.94 | 33.49 | 33.20 | 33.29 | 30.22 | 30.01 | 30.15 | 26.91 | 26.58 | 26.88 |
| | Rate | 891.62 | 915.64 | 910.84 | 597.29 | 610.31 | 611.58 | 388.42 | 398.64 | 399.61 | 242.23 | 250.40 | 255.31 |

Fig. 2

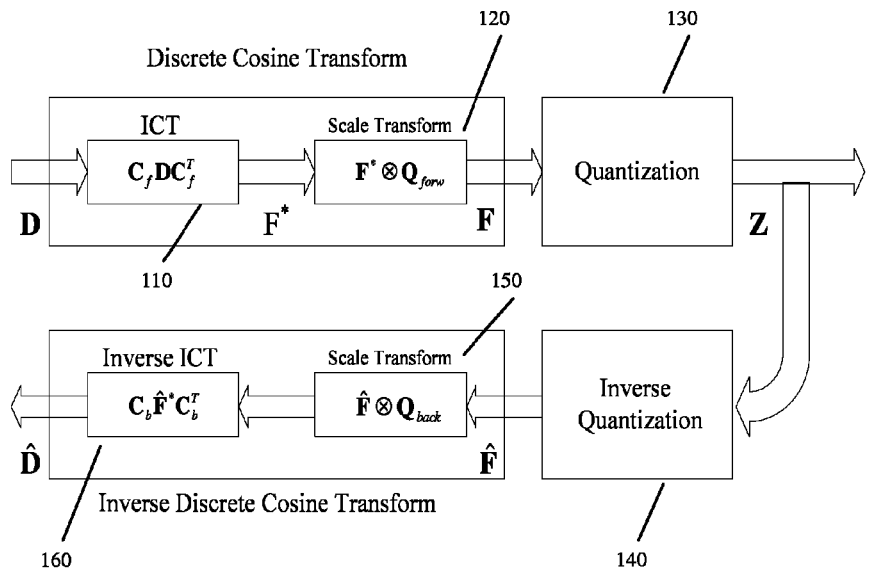

Fig. 3: $\Delta_{ij}$ in different positions

| Position Region | Position (i, j) | $\Delta_{ij}$ |
|---|---|---|
| I | (0,0),(0,2),(2,0),(2,2) | $\Delta/a^2$ |
| II | (1,1),(1,3),(3,1),(3,3) | $4\Delta/b^2$ |
| III | Others | $2\Delta/ab$ |

Fig. 4: Quantization Diagram

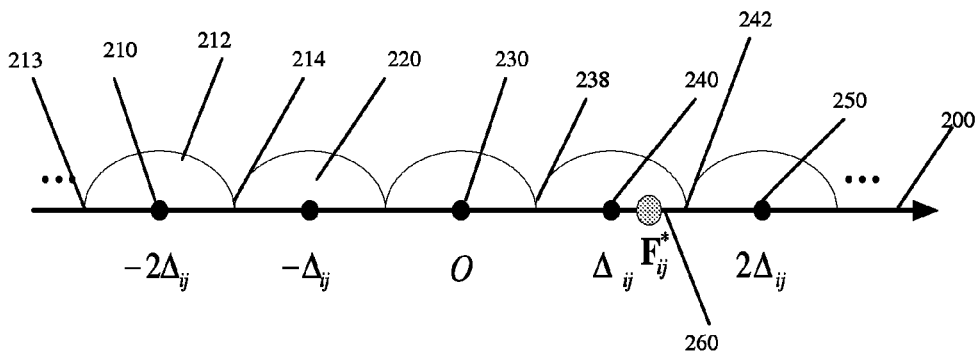

Fig. 5: Quantization points and quantization zones

| Inverse quantized value | ... | $-2\Delta_{ij}$ | $-\Delta_{ij}$ | 0 | $\Delta_{ij}$ | $2\Delta_{ij}$ | ... |
|---|---|---|---|---|---|---|---|
| Quantization sub-zone boundaries | ... | $(-2.5\Delta_{ij}, -1.5\Delta_{ij})$ | $(-1.5\Delta_{ij}, -0.5\Delta_{ij})$ | $(-0.5\Delta_{ij}, 0.5\Delta_{ij})$ | $(0.5\Delta_{ij}, 1.5\Delta_{ij})$ | $(1.5\Delta_{ij}, 2.5\Delta_{ij})$ | ... |

Fig. 6: Relation between $\Delta_{ij}$, quantization sub-zone and quantization points

| Qstep | Position Regions | $q_{ij}$ | $\Delta_{ij}$ | Quantization range | | | | |
|---|---|---|---|---|---|---|---|---|
| $\Delta$ | I | $a^2$ | $\Delta/a^2$ | Inverse quantized value | ... | 0 | $\Delta/a^2$ | ... |
| | | | | Quantization sub-zone boundaries | ... | $(-\Delta/2a^2, \Delta/2a^2)$ | $(\Delta/2a^2, 3\Delta/2a^2)$ | ... |
| | II | $b^2/4$ | $4\Delta/b^2$ | Inverse quantized value | ... | 0 | $4\Delta/b^2$ | ... |
| | | | | Quantization sub-zone boundaries | ... | $(-2\Delta/b^2, 2\Delta/b^2)$ | $(2\Delta/b^2, 6\Delta/b^2)$ | ... |
| | III | $ab/2$ | $2\Delta/ab$ | Inverse quantized value | ... | 0 | $2\Delta/ab$ | ... |
| | | | | Quantization sub-zone boundaries | ... | $(-\Delta/ab, \Delta/ab)$ | $(\Delta/ab, 3\Delta/ab)$ | ... |

Fig. 14: Comparison of the encoding time between standard algorithm (JM encoder) and the proposed FSSD algorithms in Akiyo

| QP | Conventional SSD Algorithm (ms) | FSSD Algorithm (ms) | Time reduction by iterative Fig.-lookup quantization (%) | Time reduction by inverse transform and pixel reconstruction (%) | Total reduction of encoding time (%) |
|---|---|---|---|---|---|
| 28 | 89261 | 76512 | 6.61 | 7.67 | 14.28 |
| 32 | 85365 | 72374 | 6.85 | 8.37 | 15.22 |
| 36 | 83705 | 71731 | 6.74 | 7.56 | 14.30 |
| 40 | 83363 | 71468 | 6.68 | 7.79 | 14.47 |

Fig. 15: Comparison of the encoding time between standard algorithm (JM encoder) and the proposed FSSD algorithms in Foreman

| QP | Conventional SSD Algorithm (ms) | FSSD Algorithm (ms) | Time reduction by iterative Fig.-lookup quantization (%) | Time reduction by inverse transform and pixel reconstruction (%) | Total reduction of encoding time (%) |
|---|---|---|---|---|---|
| 28 | 103621 | 90812 | 5.65 | 6.71 | 12.36 |
| 32 | 95812 | 83721 | 6.15 | 6.47 | 12.62 |
| 36 | 89764 | 78267 | 6.31 | 6.50 | 12.81 |
| 40 | 84427 | 72891 | 6.68 | 6.98 | 13.66 |

Fig. 16: Comparison of the encoding time between standard algorithm (JM encoder) and the proposed FSSD algorithms in Container

| QP | Conventional SSD Algorithm (ms) | FSSD Algorithm (ms) | Time reduction by iterative Fig.-lookup quantization (%) | Time reduction by inverse transform and pixel reconstruction (%) | Total reduction of encoding time (%) |
|---|---|---|---|---|---|
| 28 | 101251 | 90139 | 4.48 | 6.49 | 10.97 |
| 32 | 93789 | 83394 | 4.64 | 6.44 | 11.08 |
| 36 | 87862 | 76931 | 5.12 | 7.32 | 12.44 |
| 40 | 82681 | 72158 | 5.50 | 7.23 | 12.73 |

Fig. 17: Comparison of the encoding time between standard algorithm (JM encoder) and the proposed FSSD algorithms in Stefan

| QP | Conventional SSD Algorithm (ms) | FSSD Algorithm (ms) | Time reduction by iterative Fig.-lookup quantization (%) | Time reduction by inverse transform and pixel reconstruction (%) | Total reduction of encoding time (%) |
|---|---|---|---|---|---|
| 28 | 126685 | 115892 | 4.06 | 4.46 | 8.52 |
| 32 | 114568 | 103625 | 4.25 | 5.30 | 9.55 |
| 36 | 102638 | 92258 | 4.71 | 5.40 | 10.11 |
| 40 | 95921 | 85784 | 5.08 | 5.49 | 10.57 |

Fig. 18: Average number of iterative lookup operation for different videos

| QP | Akiyo | Foreman | Container | Stefan |
|---|---|---|---|---|
| 28 | 0.29 | 0.40 | 0.45 | 0.73 |
| 32 | 0.26 | 0.37 | 0.40 | 0.67 |
| 36 | 0.11 | 0.16 | 0.20 | 0.31 |
| 40 | 0.05 | 0.08 | 0.11 | 0.15 |

Fig. 19: Comparison of the rate-distortion performance between standard algorithm (JM encoder) and the proposed FSSD algorithms in Akiyo

| QP | PSNR – dB (Conventional SSD) | PSNR - dB (FSSD) | Bit-rate - Kbps (Conventional SSD) | Bit-rate - Kbps (FSSD) |
|---|---|---|---|---|
| 28 | 39.94 | 39.94 | 218.09 | 218.09 |
| 32 | 36.95 | 36.95 | 154.03 | 154.18 |
| 36 | 34.30 | 34.30 | 111.77 | 111.84 |
| 40 | 31.43 | 31.42 | 80.78 | 80.71 |

Fig. 20: Comparison of the rate-distortion performance between standard algorithm (JM encoder) and the proposed FSSD algorithms in Foreman

| QP | PSNR - dB (Conventional SSD) | PSNR - dB (FSSD) | Bit-rate - Kbps (Conventional SSD) | Bit-rate - Kbps (FSSD) |
|---|---|---|---|---|
| 28 | 37.84 | 37.82 | 421.58 | 420.86 |
| 32 | 34.90 | 34.87 | 251.64 | 251.35 |
| 36 | 32.40 | 32.40 | 163.58 | 163.70 |
| 40 | 29.69 | 29.67 | 110.09 | 109.94 |

Fig. 21: Comparison of the rate-distortion performance between standard algorithm (JM encoder) and the proposed FSSD algorithms in Container.

| QP | PSNR - dB (Conventional SSD) | PSNR - dB (FSSD) | Bit-rate - Kbps (Conventional SSD) | Bit-rate - Kbps (FSSD) |
|---|---|---|---|---|
| 28 | 38.09 | 38.09 | 331.82 | 331.92 |
| 32 | 35.28 | 35.27 | 212.09 | 211.53 |
| 36 | 32.61 | 32.60 | 145.46 | 145.18 |
| 40 | 29.85 | 29.84 | 100.13 | 100.10 |

Fig. 22: Comparison of the rate-distortion performance between standard algorithm (JM encoder) and the proposed FSSD algorithms in Stefan

| QP | PSNR - dB (Conventional SSD) | PSNR - dB (FSSD) | Bit-rate - Kbps (Conventional SSD) | Bit-rate - Kbps (FSSD) |
|---|---|---|---|---|
| 28 | 37.16 | 37.15 | 891.62 | 890.88 |
| 32 | 33.49 | 33.48 | 597.29 | 597.58 |
| 36 | 30.22 | 30.21 | 388.42 | 389.12 |
| 40 | 26.91 | 26.88 | 242.23 | 242.06 |

Fig. 23: Performance of fast SSD algorithms with rate estimation in Akiyo

| QP | Reduction of encoding time (%) | PSNR reduction -dB | Bit rate increase (%) |
|---|---|---|---|
| 28 | 40.85 | -0.08 | 0.08 |
| 32 | 37.66 | -0.12 | 2.84 |
| 36 | 34.91 | -0.08 | 2.63 |
| 40 | 31.19 | -0.02 | 0.47 |

Fig. 24: Performance of FSSD algorithms with rate estimation in Foreman

| QP | Reduction of encoding time (%) | PSNR reduction -dB | Bit rate increase (%) |
|---|---|---|---|
| 28 | 40.03 | -0.03 | 1.01 |
| 32 | 36.43 | -0.04 | 2.15 |
| 36 | 34.32 | -0.02 | 0.62 |
| 40 | 30.45 | -0.02 | 0.24 |

Fig. 25 Performance of FSSD algorithms with rate estimation in Container

| QP | Reduction of encoding time (%) | PSNR reduction -dB | Bit rate increase (%) |
|---|---|---|---|
| 28 | 39.84 | -0.08 | 0.91 |
| 32 | 38.02 | -0.10 | 0.02 |
| 36 | 34.50 | -0.03 | 1.61 |
| 40 | 33.51 | -0.06 | 1.59 |

Fig. 26 Performance of FSSD algorithms with rate estimation in Stefan

| QP | Reduction of encoding time (%) | PSNR reduction -dB | Bit rate increase (%) |
|---|---|---|---|
| 28 | 43.00 | -0.11 | 0.51 |
| 32 | 38.57 | -0.10 | 0.53 |
| 36 | 36.09 | -0.06 | 0.52 |
| 40 | 29.75 | -0.08 | 1.31 |

METHOD AND APPARATUS FOR CALCULATING AN SSD AND ENCODING A VIDEO SIGNAL

FIELD OF THE INVENTION

The present invention relates to a method and apparatus for calculating the sum of squared differences between an original block and a reconstructed block of image or video data and/or a method and apparatus for determining the distortion caused by encoding a block of image or video data. The present invention also proposes an apparatus and method for encoding image or video data, in which an appropriate encoding mode is selected from a plurality of possible encoding modes. The method and apparatus may be used for encoding a H.264/AVC video signal, but the present invention is not limited to that format and may be used to encode other formats of video and image data as well.

BACKGROUND TO THE INVENTION

A video signal typically comprises a series of frames, each showing an image at one instant in time. When the frames are displayed quickly in succession they give the impression of a moving image. In order to reduce the data rate required to store or send a video signal, compression algorithms (commonly known as a 'codecs') are used to encode the data. Such compression algorithms typically divide each frame into a number of smaller blocks, each of which is encoded.

Color video images typically comprise several color planes, for example a RGB image comprises red, green and blue color planes, which when overlaid or mixed make up the full color image. Video applications commonly use a color scheme in which the planes do not correspond to specific colors. Instead one plane corresponds to luminance (the brightness of each pixel in the color image), and the other planes—usually two of them—contain certain color information (chrominance). When the chrominance information is combined with the luminance information, the color image can be derived and displayed, either directly or by first converting the information into separate RGB levels. The reason that a luminance-chrominance system is commonly used is that human perception is much more sensitive to differences in luminance than chrominance. Therefore video compression algorithms typically encode the chrominance information at a lower resolution than the luminance information, in order to reduce the amount of data needed, without unduly affecting image quality. Such blocks of data with differing resolutions of luminance and chrominance data are called 'macroblocks'. A typical macroblock may, for example, have two planes of chrominance data at half the vertical and half the horizontal resolution of the luminance data. However, in this patent specification the term 'macroblock' is used to mean any block of image data that has chrominance data at less resolution than luminance data.

Data in the blocks of the video frame is typically encoded by use of a transform, which transforms the data into frequency space. A Discrete Cosine Transform (DCT) is often used for this purpose, but other types of transform may be used instead. The human eye is less sensitive to information contained in the high frequency components and therefore some information relating to the higher frequencies may be discarded or encoded using fewer bits, in order to reduce the amount of data. Once this is done the transformed block may be quantized, by scaling the transform coefficients to the nearest of a number of predetermined values. For example, if the transform coefficients are between −1 and 1, then scaling the coefficient by 20 and rounding to the nearest integer quantizes the coefficient to the nearest of 41 quantization points (from −20 to +20, including 0).

After quantization, the number of bits required to encode the data is reduced further by taking advantage of certain statistical properties of the quantized data. This process is called 'entropy encoding'. For example, after quantization, many of the coefficients may have a value of zero; a type of entropy encoding called run-length coding, takes account of consecutive zero coefficients and encodes the length of each such 'run', rather than encoding each zero value separately. Other types of entropy encoding which take advantage of the statistical properties of the data, for example variable length encoding (VLC) or arithmetic coding, may also be used. The above describes simple encoding methods in which each block in each frame is encoded independently of the other frames. This method of encoding is still used, however most modern compression algorithms allow a variety of different block encoding modes, any of which may be used to encode a particular block.

An intra encoding mode is a mode in which each block is encoded on the basis of data held within that block (the source block) and on the basis of data in other blocks (reference blocks) in the same frame. The encoding process may work as follows. The contents of the source block are predicted on the basis one or more reference blocks in the same frame (this is called intra prediction). The difference between the predicted block and the source block is called a residual block. The residual block is encoded by image transforming, quantizing and entropy encoding, as explained in the paragraphs above. The encoded residual block is stored together with coding data identifying the reference blocks and identifying the encoding mode used for the intra prediction. During decoding the predicted block is computed from the coding data and the source block is reconstructed by adding the (decoded) residual block to the predicted block. There may be several different possible intra encoding modes based on different block sizes or different positions of the reference block(s) relative to the source block.

An inter encoding mode makes use of the fact that in a video signal there are often substantial similarities between successive frames, for example, in areas of the image in which there is no movement, or areas relating to a moving object which translates in position between successive frames. An inter encoding mode 'predicts' the content of a particular block (a source block) on the basis of another block (called a reference block) in a different frame (which may be one or more frames before or after the frame containing the block being predicted). This is called inter-prediction as the prediction is based in blocks in other frames. The residual block is the difference between the predicted block and the source block. The residual block is encoded by using an image transform, quantizing and entropy encoding. The encoded residual block is stored together with coding data identifying the reference block used and the particular inter-prediction mode used. The coding data may for example comprise a motion vector relating the reference block and the predicted block. During decoding the predicted block is computed from the coding data and the source block is reconstructed by adding the predicted block to the (decoded) residual block. There may be several different possible inter-prediction modes, each based on different block sizes, different reference blocks or different frames relative to the source block.

A skip mode is a special case of an inter encoding mode. It relates a source block directly to a reference block in another frame (i.e. the two are predicted to be identical). Thus, the source block is predicted to have exactly the same contents as the reference block. The source block may then be encoded as data indicating that it is a skip mode and data indicating the identity of the reference block. Decoding is carried out by finding the identity of the reference block and copying its data to form the reconstructed block.

It can be useful to know the distortion caused by encoding a block of video or image data; for example, if it is desired to encode an image but retain a given image quality. The distortion is typically measured as the sum of squared differences between coefficients of the original source block and the coefficients of the reconstructed block. Knowing the distortion is also useful when deciding which encoding mode to use, as will be explained below.

It is important to select the best mode for encoding each block, as this is an important factor in the performance of the compression algorithm. There are two principal considerations when selecting the block encoding mode; the first is the distortion which results from the encoding (i.e. the difference between the source image and the reconstructed image after decoding) and the second is the number of bits required to encode the block. Sometimes the latter consideration is referred to as 'bit rate', which is the number of bits required per second required to transmit the image at a given resolution. The bit rate is related to the overall number of bits required to encode the block. It is necessary not only to select between inter, intra and skip modes, but also to select the best type of inter encoding or best type of intra encoding.

One known theoretical method of choosing the best block encoding mode is to compute the rate-distortion cost of all the possible modes. The rate-distortion cost is a parameter, which takes account of both the distortion caused by the encoding and the number of bits required to encode the block.

It is possible to encode and decode each block to find the distortion and bit rate for each mode directly. For example, in the H.264/AVC encoding process, the best macroblock encoding mode may be selected by computing the rate-distortion cost of all possible modes. The best mode is typically the one with minimum rate-distortion cost. The rate distortion cost for a given mode may be defined as:

$$J_{RD} = SSD(S,C) + \lambda \cdot R \quad \text{(EQUATION 1)}$$

where $J_{RD}$ represents the rate distortion, $\lambda$ is the Lagrange multiplier, R is the number of bits required to encode the block according to that mode, and the SSD(S,C) is the sum of the squared differences (SSD) between the original blocks S and the reconstructed block C when that encoding mode is used. The sum of squared differences can be expressed as:

$$SSD(S, C) = \sum_{i=0}^{N-1}\sum_{j=0}^{N-1} (s_{ij} - c_{ij})^2 = \|S - C\|_F^2 \quad \text{(EQUATION 2)}$$

where $s_{ij}$ and $c_{ij}$ are the (i,j)th elements of the current original block S and the reconstructed block C, respectively. Moreover, N is the image block size (N=4 in H.264/AVC standard) and $\|\ \|_F$ is Frobenius norm. We shall call the SSD (S,C) a spatial-domain SSD since the distortion computation is performed in spatial-domain pixel values. The inventors have found that the computation of a spatial-domain SSD is very time-consuming, since it is necessary to obtain the reconstructed block after Transformation—Quantization—Inverse Quantization—Inverse Transformation—Pixel Reconstruction for each possible mode. The above method of finding the best mode by calculating the SSD (S,C) and bit rate directly for each mode is called Rate Distortion Optimization (RDO). It can find the best mode accurately, but takes a lot of time and processing power.

To accelerate the coding process, the JVT reference software version JM 6.1d estimates the rate-distortion cost by using a fast SAD-based cost function instead:

$$J_{SAD} = \begin{cases} SAD(S, P) + \lambda_1 \cdot 4K & \text{if intra } 4\times 4 \text{ mode} \\ SAD(S, P) & \text{otherwise} \end{cases} \quad \text{(EQUATION 3)}$$

where SAD(S,P) is the sum of absolute differences between the original block S and the predicted block P. $\lambda_1$ is an approximate exponential function of the quantization parameter (QP) which is almost the square of $\lambda$, and K is equal to 0 for the probable mode and 1 for the other modes. The SAD(S,P) is expressed by:

$$SAD(S, P) = \sum_{i=0}^{N-1}\sum_{j=0}^{N-1} |s_{ij} - p_{ij}| \quad \text{(EQUATION 4)}$$

where $s_{ij}$ and $p_{ij}$ are the (i,j)th elements of the current original block S and the predicted block P, respectively. This SAD-based cost function could save a lot of computations as the distortion part is based on the differences between the original block and the predicted block instead of the reconstructed block. However, this computation reduction usually comes with a quite significant degradation of coding efficiency. To achieve better rate-distortion performance, JM6.1d also provided an alternative SATD-based cost function:

$$J_{SATD} = \begin{cases} SATD(S, P) + \lambda_1 \cdot 4K & \text{if intra } 4\times 4 \text{ mode} \\ SATD(S, P) & \text{otherwise} \end{cases} \quad \text{(EQUATION 5)}$$

where SATD(S,P) is the sum of absolute Hadamard-transformed difference between the original block S and the predicted block P, which is given by:

$$SATD(S, P) = \sum_{i=0}^{N-1}\sum_{j=0}^{N-1} |h_{ij}| \quad \text{(EQUATION 6)}$$

where $h_{ij}$ are the (i, j)th element of the Hadamard transformed image block H which is the difference between the original block S and the predicted block P. The Hadamard transformed block H is defined as:

$$H = T_H(S - P)T_H^T \quad \text{(EQUATION 7)}$$

With:

$$T_H = \begin{bmatrix} 1 & 1 & 1 & 1 \\ 1 & 1 & -1 & -1 \\ 1 & -1 & -1 & 1 \\ 1 & -1 & 1 & -1 \end{bmatrix} \quad \text{(EQUATION 8)}$$

Experimental results show that the $J_{SATD}$ can achieve better rate-distortion performance than the $J_{SAD}$, but its overall rate-distortion performance is still lower than the optimized $J_{RD}$ (found by computing the rate distortion of each mode directly). Thus, neither SAD nor SATD-based functions can predict the real distortion accurately, and therefore they lead to selection of sub-optimum encoding modes which have a higher bit rate or higher distortion than the optimum.

A rate-distortion performance comparison of H.264/AVC using RDO-based, SAD-based and SATD-based cost functions for different QPs (quantization step sizes) and three well-known test sequences in terms of PSNR and bit-rate is shown in the table in FIG. 1. As can be seen from the table, compared with a RDO-based encoder, the SAD-based and SATD-based cost functions are not good at selecting the mode having the best (lowest) rate-distortion cost.

In summary, computing the rate-distortion cost (hereinafter also referred to as rate-distortion) of each mode directly from the source and reconstructed blocks takes a lot of processing power and is not practical to carry out in real time without high end computing hardware. Meanwhile using the SAD and SADT functions are not good at predicting the real rate-distortion caused by the encoding process and may result in sub-optimum modes being selected.

SUMMARY OF THE INVENTION

It would be desirable to have a quick and efficient way of determining the distortion caused by encoding a block and a quick and efficient method of encoding blocks using an encoding scheme that is capable of utilizing a plurality of different possible encoding modes and selecting the best mode for the job.

Accordingly, one aspect of the present invention proposes that the distortion is calculated in transform domain space, for example on the basis of a difference between the source and reconstructed blocks in frequency space. It is further advantageous if the quantization of the transformed block in frequency space is carried out with the aid of a look up table. In preferred embodiments of the invention it may be possible to carry out the quantization and/or inverse quantization step without multiplication or division functions, which take a lot of processing power.

A first aspect of the present invention provides a method for calculating the sum of squared differences between an original block S and a reconstructed block R of image or video data, the method comprising the steps of:

a) computing a predicted block P corresponding to the original block S, using inter or intra frame prediction;

b) calculating a residual block D from the original block S and the predicted block P, said residual block D having a plurality of coefficients;

c) applying an integer image transform to the coefficients of the residual block D so as to obtain a transformed residual block F*, said transformed residual block having a plurality of coefficients $f_{ij}^*$;

d) finding a plurality of coefficients $\hat{f}_{ij}^*$, the coefficients $\hat{f}_{ij}^*$ being defined by the equation $\hat{f}_{ij}^* = Q^{-1}(Q(f_{ij}^*))$, where Q is an operator which performs quantizing and $Q^{-1}$ is the inverse of the Q operator; and e) computing a sum of squared differences between $f_{ij}^*$ and $\hat{f}_{ij}^*$.

As the sum of squared differences is calculated in the residual domain, it is not necessary to reconstruct the block in order to calculate the distortion. This saves some processing time. Furthermore, as the sum of squared differences is calculated in the transform domain, further processing is saved as it is not necessary to carry out the inverse image transform to calculate the distortion. In addition, as the method uses an integer image transform, the coefficients $f_{ij}^*$, will be integers. The coefficients $\hat{f}_{ij}^*$ may be integers or fractional numbers.

The quantizing performed by the operator Q may be pre-scaled quantizing. Pre-scaled quantizing means that the quantization step for each coefficient is scaled according to the location of the coefficient in the integer transformed residual block F*. This has the effect of making the integer image transform orthogonal (which is required by most video and image encoding processes). In other words, the necessary scaling of the integer transform is integrated into the quantization process.

For example, the ICT transform requires scaling to make it orthogonal. Carrying out pre-scaled quantizing on a ICT transformed block F*, gives the same quantization matrix Z as would be obtained by (unscaled) quantizing of a DCT transformed residual block. The same is true of some other integer image transforms and their discrete equivalents. However, not every integer image transform requires scaling; for example the Walsh and Hadamard transforms are integer image transforms which do not require scaling.

Preferably step d) is carried out with the aid of a look up table. As a look up table is used it may be possible to avoid multiplication, division and/or rounding operations in the quantization and/or inverse quantization processes. For example, it may be possible to carry out the quantization and/or inverse quantization by simple comparison of $f_{ij}^*$ values with values held in the look up table. Preferably the look up table is referred to iteratively.

Preferably step (d) comprises the step of iteratively comparing each coefficient $f_{ij}^*$ of the transformed residual block to boundary points of quantization sub-zones stored in the look up table. A quantization sub-zone contains all the values of $f_{ij}^*$ between its upper and lower boundary points. The operator Q maps all the values of $f_{ij}^*$ within the sub-zone to a particular quantization point having a quantized value $z_{ij}$ corresponding to that sub-zone. The operator $Q^{-1}$ maps the quantized value $z_{ij}$ to an inverse quantized value $\hat{f}_{ij}^*$ corresponding to that sub-zone.

The look up table may comprise a plurality of quantization sub-zone boundaries each corresponding to a quantization point. In a preferred embodiment it may only be necessary for the look up table to relate each quantization point to a respective upper boundary, rather than both upper and lower boundaries. In the look up process, the value of each coefficient $f_{ij}^*$ may be iteratively compared with the upper boundaries of quantization points and when said upper boundary is greater than said coefficient, the coefficient $f_{ij}^*$ can be assigned a quantized value $z_{ij}$ and an inverse quantized value $\hat{f}_{ij}^*$ corresponding to the quantization sub-zone having that upper bounday. The quantized value may be stored in a look up table or based on the number of comparisons made. The inverse quantized value may be stored in the look up table or found by multiplying the quantized value with a quantization parameter $\Delta_{ij}$ which may be stored in the look up table. The quantization parameter $\Delta_{ij}$ may have different values for different i,j positions. In this way the Q and $Q^{-1}$ operations can be carried out by using the look up table.

Preferably the absolute value of each coefficient $f_{ij}^*$ is iteratively compared to boundaries of quantization sub-zones having progressively higher quantization point values until said absolute value of said coefficient is lower than a quantization sub-zone boundary. Because an absolute value is used, the sign (positive or negative) of the coefficient $f_{ij}^*$ can be ignored in the look up process and introduced later to ensure that the $\hat{f}_{ij}^*$ and/or $z_{ij}$ values are given the right sign. This makes the comparison process simpler and quicker and simpler (as only positive values have to be compared in the look up process and the look up table does not have to contain negative values).

Preferably the iterative table-look up process is carried out in parallel for each coefficient $f_{ij}^*$ of the transformed residual block. This further enhances the efficiency of the computation process.

Preferably for each coefficient $f_{ij}^*$ of said transformed residual block, said quantization sub-zone boundaries referred to in the look up table, depend on the position of the coefficient $f_{ij}^*$ in the transformed residual block.

While it would be possible to find the inverse quantized value $\hat{f}_{ij}^*$ directly from the look up table, without first finding the quantized value, it is preferred that the quantized value is found as well as described above. Once the quantized values have been found the numbers of bits required to entropy encode the quantized block Z can then easily be found. This information gives an indication of the effectiveness of the compression process and can be used to calculate the rate-distortion.

The method may include the step of entropy encoding the block Z. Any suitable type of entropy encoding may be used or considered by the method, for example VLR encoding, run length coding and arithmetic coding.

The source block may correspond to a single macroblock, contain one or more sub-sections of a macroblock, or contain several macroblocks.

The integer image transform may be any type of integer image transform. In a preferred embodiment an integer cosine transform (ICT) is used. Alternatively a Hadamard transform or a Walsh transform could be used. Other possibilities will be apparent to a person skilled in the art.

A second aspect of the present invention provides a method of calculating the distortion caused by encoding image or video data according to a first encoding mode, the method comprising carrying out the first aspect of the invention, wherein in step (a) the predicted block is computed according to said first encoding mode and wherein the calculated distortion is based on the sum of squared differences computed in step (e). This information can be used to decide whether the encoding mode is suitable or not.

A third aspect of the present invention provides a method of encoding video or image data, the method comprising defining an area in a frame of video or image data, calculating the distortion which would be caused by encoding said area according to a first encoding mode, said distortion being calculated by using the method of the second aspect of the present invention, comparing said distortion with the distortion which would be caused by encoding said area according to a second encoding mode, selecting one of said first and second encoding modes on the basis of said comparison, and encoding said data according to the selected encoding mode.

It is usually best to take account of not just the distortion which would be caused by a particular encoding mode, but also the bit rate required to encode a block according to that mode. Therefore, it is preferred that the second aspect of the present invention calculates the rate-distortion and the third aspect of the invention selects an encoding mode on the basis of a comparison of the rate distortions caused by the various possible encoding modes.

The rate-distortion caused for a particular encoding mode can be calculated based on the sum of squared differences computed in step (e) of the methods above and on the number of bits required to entropy encode the quantized transformed residual block Z.

Preferably the rate-distortion is calculated by the formula $J_{RD} = SSD + \lambda \cdot R$, where $J_{RD}$ is a parameter representing the rate distortion, SSD is the sum of squared differences computed in step (e), R is the number of bits required to entropy encode the block and $\lambda$ is a Lagrange multiplier.

Preferably the method selects the encoding mode which will produce the least distortion of the block or the encoding mode which has the lowest rate-distortion.

Preferably the distortion or rate-distortion produced by the second block mode is estimated or calculated according to the methods described above.

A fourth aspect of the present invention provides a method for calculating the sum of squared differences between an original block S and a reconstructed block R of image or video data, the method comprising the steps of:

a) computing a predicted block P corresponding to the original block S, using inter or intra frame prediction;

b) calculating a residual block D from the original block S and the predicted block P, said residual block D having a plurality of coefficients;

c) applying an image transform to the coefficients of the residual block D so as to obtain a transformed residual block F, said transformed residual block having a plurality of coefficients;

d) finding the coefficients of a first matrix $\hat{F}$, said first matrix being an inverse quantized transform of said residual block; and e) computing the sum of squared differences between said transformed residual block F and said first matrix $\hat{F}$.

This method is similar to the first aspect of the present invention, but less restrictive in that the image transform does not need to be an integer image transform and therefore pre-scaling may not be necessary. For example, the image transform may be a Discrete Cosine Transform. The method has the advantage that the sum of squared differences is calculated in the transformed residual domain and so the computations involved in reconstruction and the inverse transform are avoided.

Preferably the method further comprises the step of quantizing the coefficients of said transformed residual block F to obtain a quantized transformed residual block Z.

Preferably step (d) is carried out with the aid of a look up table.

A fifth aspect of the present invention provides a system for calculating the sum of squared differences between an original block S and a reconstructed block R of image or video data; the system comprising:

a) a predicting module for predicting a predicted block P, corresponding to an original block of data S, by using inter or intra prediction;

b) a residual block defining module for calculating a residual block D, which is the difference between said predicted block P and said original block S;

c) a transform module for performing an integer image transform on said residual block D to obtain a transformed residual block F* having a plurality of co-efficients $f_{ij}^*$;

d) an inverse quantization module for finding a plurality of coefficients $\hat{f}_{ij}^*$ the coefficients $\hat{f}_{ij}^*$ being defined by the equation $\hat{f}_{ij}^* = Q^{-1}(Q(f_{ij}^*))$, where Q is an operator which performs quantizing and $Q^{-1}$ is the inverse of the Q operator;

e) a difference function computing module for computing a sum of squared differences between $f_{ij}^*$ and $\hat{f}_{ij}^*$.

The operator Q may perform pre-scaled quantization.

Preferably the inverse quantization module is arranged to operate by referring to a look up table stored in a memory of the system.

A sixth aspect of the present invention provides a system for encoding video or image data, the system comprising:

(f) a block defining module for defining a first area in the video or image data, said area comprising one or more blocks of data;

(g) a system according to the fifth aspect of the present invention for calculating the sum of squared differences between $f_{ij}^*$ and $\hat{f}_{ij}^*$ when a block of data in said area is encoded according to an encoding mode;

(h) a quantizing module for carrying out quantizing of the coefficients of the transformed residual block F* to obtain a quantized transformed residual block Z (i) an entropy encoding module for entropy encoding the quantized transformed residual block Z;

(j) a rate-distortion calculating module for calculating the rate-distortion of an encoding mode, based on the number of bits required to entropy encode one or more blocks of data according to said encoding mode and the sum of squared differences between $f_{ij}^*$ and $\hat{f}_{ij}^*$ for one or more blocks of data encoded according to said encoding mode;

(k) an encoding mode selection module for selecting an encoding mode for encoding the video or image data from a plurality of possible encoding modes, said module being arranged to select the encoding mode on the basis of a comparison of the respective rate-distortions of the possible encoding modes.

The quantizing module may be arranged for carrying out pre-scaled quantization.

The quantizing module and inverse quantizing module may be provided as a single module.

In both the above aspects of the invention, the modules carry out similar functions to the method of the first aspect of the present invention. The modules may be hardware, software or firmware elements or combinations thereof. For example, they may be circuits or parts of an integrated circuit, or may be software elements in a programmable logic device or in a program run on a computer.

A seventh aspect of the invention provides a system comprising hardware, software or firmware elements, arranged for carrying out a method according to any one of the first to fourth aspects of the present invention.

A eighth aspect of the invention provides a program, stored on a computer-readable medium, the program including instructions for causing an apparatus to carry out the method of any one of the first to fourth aspects of the present invention.

BRIEF DESCRIPTION OF THE ACCOMPANYING DRAWINGS

FIG. 1 is a table showing the rate-distortion performance of RDO-based, SAD-based and SATD-based cost functions;

FIG. 2 is a schematic diagram showing the ICT and quantization process used in the H.264/AVC coding standard;

FIG. 3 is a table showing the values of the quantization parameter $\Delta_{ij}$ for different position regions;

FIG. 4 is a quantization diagram;

FIG. 5 is a table showing some inverse quantized values and corresponding sub-zone boundaries for some quanitization points;

FIG. 6 is a table showing inverse quantized values and quantization sub-zone boundaries for different positions regions;

FIG. 14 is a table comparing the encoding time for a standard JM encoder with an encoder using a method according to an embodiment of the present invention;

FIG. 15 is a table comparing the encoding time for a standard JM encoder with an encoder using a method according to an embodiment of the present invention;

FIG. 16 is a table comparing the encoding time for a standard JM encoder with an encoder using a method according to an embodiment of the present invention;

FIG. 17 is a table comparing the encoding time for a standard JM encoder with an encoder using a method according to an embodiment of the present invention;

FIG. 18 is a table showing the average number of iterative lookup operations for different videos;

FIG. 19 is a table comparing the rate distortion performance of a standard JM encoder with an encoder using the method of the present invention;

FIG. 20 is a table comparing the rate distortion performance of a standard JM encoder with an encoder using the method of the present invention;

FIG. 21 is a table comparing the rate distortion performance of a standard JM encoder with an encoder using the method of the present invention;

FIG. 22 is a table comparing the rate distortion performance of a standard JM encoder with an encoder using the method of the present invention;

FIG. 23 is a table showing the performance of the method of the present invention when combined with other fast algorithms;

FIG. 24 is a table showing the performance of the method of the present invention when combined with other fast algorithms;

FIG. 25 is a table showing the performance of the method of the present invention when combined with other fast algorithms; and FIG. 26 is a table showing the performance of the method of the present invention when combined with other fast algorithms.

DETAILED DESCRIPTION

I. Introduction

Figure 7:
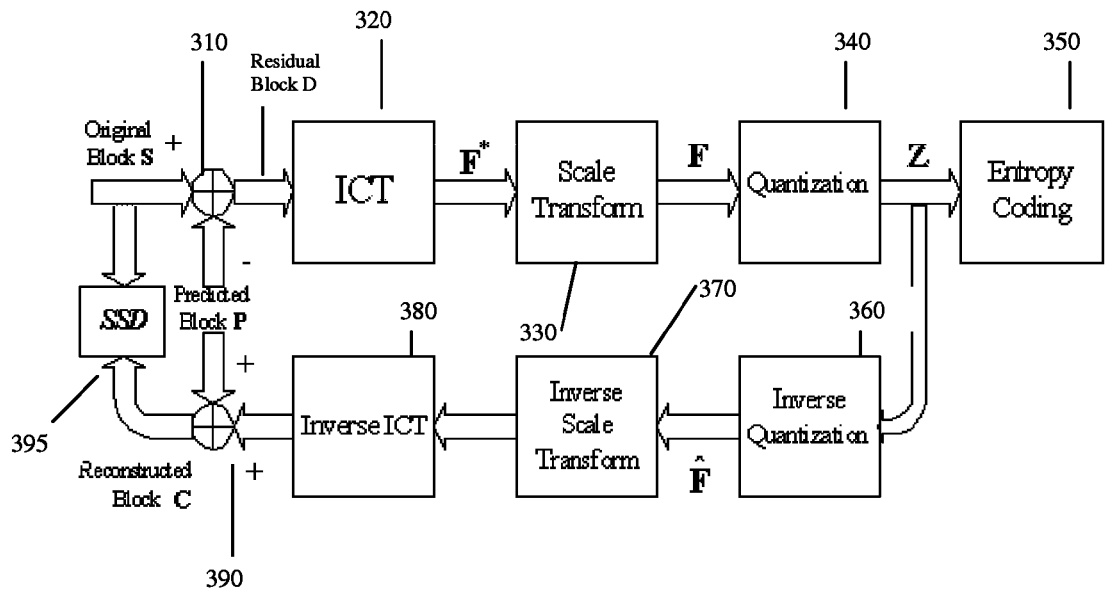
FIG. 7 is a schematic diagram showing a method of calculating the SSD between source and reconstructed blocks directly.

The present invention relates to a method and apparatus for determining the distortion caused by encoding a block of video or image data. This may be conveniently calculated based on the squared sum or differences between a source block and a reconstructed block of image or video data. The rate-distortion of a particular inter or intra encoding mode may also be calculated on the basis of the distortion and the number of bits required to entropy encode a block which has been encoding according to the particular inter or intra encoding mode. Preferred embodiments of the present invention relate to a method of encoding image or video data, including selecting an encoding mode based on the rate-distortion of said mode.

The present invention may be utilized with any image or video encoding standard which uses inter or intra prediction. However, it may be particularly suitable for use with the new H.264/AVC standard. Accordingly this standard now will be briefly discussed, although it is to be understood that the present invention may be used with other encoding standards.

H.264/AVC is one of the newest image and video encoding standards. H.264/AVC greatly outperforms the previous MPEG-1/2/4 and H.261/263 standards in terms of both picture quality and compression efficiency. In some implementations it may provide the same picture quality as DVD (or MPEG-2) video while only consuming about 25% of the storage space and its bit-rate is about half of that of the MPEG-4 advanced simple profile. To achieve this superior coding performance, H.264/AVC adopts many advanced techniques, such as directional spatial prediction for intra frame coding, variable and hierarchical block transform, arithmetic entropy coding, multiple reference frame motion compensation, deblocking, etc. It also uses 7 different block sizes for motion-compensation in the inter mode, and 3 different block sizes with various spatial directional prediction modes in the intra mode. The main critical process employed is the rate-distortion optimized mode decision technique which provides H.264/AVC much better coding performance in terms of compression efficiency and visual quality. To select the best macroblock coding mode, an H.264/AVC encoder needs to compute the rate-distortion cost of all possible modes, which involves computation of integer transform, quantization, variable length coding and pixel reconstruction processes. All of this processing explains the high computational complexity of rate-distortion cost calculation. Hence, the cost function computation makes H.264/AVC impossible to realize in real-time applications without high computing hardware.

Accordingly, a preferred embodiment of the present invention proposes a new fast sum of squared difference (FSSD) computation algorithm which uses an iterative table-lookup quantization process. This may reduce the complexity of the H.264 rate-distortion cost function calculation with good coding efficiency as compared with conventional methods of rate-distortion optimization. The proposed algorithm can also be combined with fast bit-rate estimation algorithm to further speed up the computation with minimal performance degradation.

In section II we give the inventors' analysis of the fundamental causes, which determine distortion. In Section III, a FSSD algorithm for calculating distortion is presented. Section IV describes certain preferred methods and apparatus for performing the methods and Section V presents simulation results generated by a preferred embodiment of the invention.

II. Transform Domain Sum Squared Difference

In this section, we analyze the major cause of the SSD (sum of squared differences) between the original block and reconstructed block in the rate-distortion cost function. One method of calculating the rate-distortion cost ($J_{RD}$) for video and image encoding schemes, such as MPEG-like or H.264/AVC schemes, can be summarized as:

Compute the predicted block using inter or intra frame prediction: P

Using the original block S and the predicted block P to compute the residual (difference) block: D=S−P Discrete Cosine Transform (DCT) the residual block:

$$F = DCT(D) = T_{DCT} D T_{DCT}^T \qquad \text{(EQUATION 9)}$$

where $T_{DCT}$ is the DCT matrix which is a unitary matrix and $T_{DCT}^T$ is the transported matrix of $T_{DCT}$.

Quantization of the transformed residual block: Z=Q(F)

Entropy code of the Z to find the number of bits to encode the block: R=VLC(Z)

Inverse quantization: $\hat{F} = Q^{-1}(Z)$

Inverse transform the inverse quantized block: $\hat{D} = DCT^{-1}(\hat{F})$

Compute the reconstructed image block: $C = \hat{D} + P$

Calculate the R-D cost: $J_{RD} = SSD(S,C) + \lambda \cdot R$ 2.1 Differential-Domain SSD Mathematically, the original block S and reconstructed block C can be expressed as:

$$S = D + P \qquad \text{EQUATION (10)}$$

$$C = \hat{D} + P \qquad \text{EQUATION (11)}$$

where the P is the predicted block, D is the residual block and $\hat{D}$ is the reconstructed residual block. Based on this relationship, the spatial-domain SSD(S,C) can be expressed as differential-domain SSD(D,$\hat{D}$):

$$SSD(S,C) = \|S-C\|_F^2 = \|D+P-\hat{D}-P\|_F^2 = \|D-\hat{D}\|_F^2 = SSD(D,\hat{D}) \qquad \text{(EQUATION 12)}$$

That means the spatial-domain SSD(S,C) is equivalent to differential-domain SSD(D,$\hat{D}$)). Based on this relationship, we can calculate the rate distortion cost in the differential-domain with $J_{RD} = SSD(D,\hat{D}) + \lambda \cdot R$, which avoids computing the reconstructed image block ($C = \hat{D} + P$).

2.2 Transform-Domain SSD

Before we define the transform-domain SSD, we need to emphasize that the DCT matrix $T_{DCT}$ used in MPEG-like or H.264/AVC video coding is a unitary matrix, which has the property [16] of:

$$\|X\|_F = \|T_{DCT} X T_{DCT}^T\|_F \qquad \text{(EQUATION 13)}$$

where X is a square matrix. As the DCT matrix $T_{DCT}$ is a unitary matrix, it is also possible to perform an inverse transform. According to Equations 12 and 13, we can also express the SSD in transform-domain as:

$$\begin{aligned}
SSD(S,C) &= \|D - \hat{D}\|_F^2 \\
&= \|T_{DCT}(D - \hat{D})T_{DCT}^T\|_F^2 \\
&= \|T_{DCT} D T_{DCT}^T - T_{DCT} \hat{D} T_{DCT}^T\|_F^2 \\
&= \|F - \hat{F}\|_F^2 \\
&= SSD(F, \hat{F})
\end{aligned} \qquad \text{(EQUATION 14)}$$

where F and $\hat{F}$ are the transformed residual block and inverse quantized-transformed residual block. Equation 14 shows that the cause of the SSD is due to the quantization errors in the DCT transformed residual block $\hat{F}$. The reason behind this is that the quantization is applied to the transformed coefficients of F. That is why SAD(S,P) and SATD (S,P) cannot well predict the SSD(S,C). Both SAD(S,P) and SATD(S,P) are determined by the original block and predicted block, without considering the influence of quantization which the inventors have determined is the real reason of the SSD. For example, if the quantization step=18 and all the transform coefficients are multiples of 18, then the quantized coefficients would be the same as the inverse quantized coefficients without error. By way of example only if:

$$F = \begin{bmatrix} 180 & 72 & 54 & 18 \\ 72 & 36 & 18 & 18 \\ 36 & 18 & 18 & 18 \\ 18 & 18 & 18 & 0 \end{bmatrix} \text{ and the quanization step is 18, then}$$

$$\hat{F} = \begin{bmatrix} 180 & 72 & 54 & 18 \\ 72 & 36 & 18 & 18 \\ 36 & 18 & 18 & 18 \\ 18 & 18 & 18 & 0 \end{bmatrix}$$

This demonstrates that even if most of the coefficients of F are large, SSD(S,C) can be zero if $\|F-\hat{F}\|_F^2=0$. The example indicates that the elements of D or F are not directly related to the SSD(S,C) which is determined by the quantization error. That is why the rate-distortion performance of SAD-based and SATD-based cost functions, which do not take account of the quantization error, is sub-optimum.

On the other hand, the transform-domain SSD(F,$\hat{F}$) can be used to reduce the number of computations required for the rate distortion cost calculation; i.e. the rate distortion can be calculated using the equation $J_{RD}=SSD(F,\hat{F})+\lambda \cdot R$, which allows the inverse DCT transform and image block reconstruction to be avoided. Another advantage of using this transform-domain SSD(F, $\hat{F}$) is that, ignoring the clipping function applied in the practical computation, there should not be any performance degradation in terms of both coding efficiency and reconstructed image distortion as SSD(F,$\hat{F}$) and SSD(S, C) are theoretically equivalent.

In H.264/AVC, however, a DCT is not used as the image transform. Rather an integer image transform, the Integer Cosine Transform (ICT), is used instead to reduce the computational complexity. This is discussed below.

III. Fast Sum of the Squared Difference Computation 3.1 Review of Integer Cosine Transform in H.264

The practical implementation of the DCT and quantization process in H.264/AVC is a little bit different from Equation 9 and its architecture is shown in FIG. 2. The DCT is implemented by ICT with scaling factors for complexity reduction (See A. Hallapuro, M. Karczewicz, "Low Complexity Transform and Quantization", in Joint Video Team (JVT) of ISO/IEC MPEG and ITU-T VCEG, Doc. JVT-B038 and JVT-B039, January 2002., which is incorporated herein by reference).

In simple terms the ICT is an integer transform which is computationally easier to calculate than a DCT because unlike a DCT, all of its coefficients are integers. Therefore many division and/or floating point operations are avoided and the ICT may be realized by shift and addition operations only. Prior to quantization, scaling factors are applied to make the ICT equivalent to a DCT.

The present invention is not limited to cosine transforms and other types of transform can be used instead, for example an image a Hadamard Transform or a Walsh Transform. It is preferred to use an integer image transform. Some integer image transforms such as an ICT, will need scaling factors in order to make it an orthogonal transform, as being orthogonal is necessary requirement for most video and image encoding standards.

FIG. 2 shows how the ICT and scaling factors are implemented in practice to give a transform equivalent to a DCT. It can be seen that in step 110 the residual block D is ICT transformed to give an integer image transformed residual block F*. The transformed residual block F* is then scaled in step 120 to give a scaled integer image transformed residual block F. The combination of the operations 110 and 120 is equivalent to a Discrete Cosine Transform (DCT) and the block F is equivalent to the block that would be obtained by performing a DCT on the residual block D. The block F, is then quantized in step 130 to give a quantization matrix Z, which may also be called a quantized transformed residual block. In step 140 inverse quantization is carried out to dequantize the coefficients of the quantized transformed residual block Z. The inverse quantizing produces an inverse quantized transform of the residual block $\hat{F}$. The block $\hat{F}$ is then inverse scale transformed in step 150 and inverse ICT transformed in step 160. Steps 150 and 160 have the combined effect of performing a transform similar to an inverse DCT and the result is the reconstructed residual block $\hat{D}$ in the spatial domain.

The relationship between the DCT and the ICT can be expressed as:

$$F=DCT(D)=C_f DC_f^T \otimes Q_{forw}=ICT(D)\otimes Q_{forw}=F^* \otimes Q_{forw} \quad \text{(EQUATION 15)}$$

where, $C_f$ is called ICT core matrices, $Q_{forw}$ is called scaling factors and F* is the ICT transformed block. The symbol $\otimes$ indicates the operator that each element of $C_f DC_f^T$ (or F*) is multiplied by the scaling factor in the corresponding position. The forward core and scale transform matrices are defined as:

$$C_f = \begin{bmatrix} 1 & 1 & 1 & 1 \\ 2 & 1 & -1 & -1 \\ 1 & -1 & -1 & 1 \\ 1 & -2 & 2 & -1 \end{bmatrix}, Q_{forw} = \begin{bmatrix} a^2 & \frac{ab}{2} & a^2 & \frac{ab}{2} \\ \frac{ab}{2} & \frac{b^2}{4} & \frac{ab}{2} & \frac{b^2}{4} \\ a^2 & \frac{ab}{2} & a^2 & \frac{ab}{2} \\ \frac{ab}{2} & \frac{b^2}{4} & \frac{ab}{2} & \frac{b^2}{4} \end{bmatrix},$$

where $a=\frac{1}{2}$, $b=\sqrt{2/5}$. The purpose of carrying out an ICT rather than a DCT is to reduce the computation complexity, because the core transform of the ICT can be realized by shift and addition operations only without multiplication. The quantization process of Z=Q(F) for the transformed residual block F can be expressed as a rounding operation on each coefficient of F:

$$z_{ij}=\text{round}(f_{ij}/\Delta) \quad \text{(EQUATION 16)}$$

where $z_{ij}$ and $f_{ij}$ are coefficients of the quantized transform and unquantized transform blocks of Z and F, respectively. $\Delta$ is the quantization step size, which is determined by the QP factor (the quantized step size). On the other hand, the inverse quantization process of $\hat{F}=Q^{-1}(Z)$ can be expressed as an operation on each coefficients of Z:

$$\hat{f}_{ij}=z_{ij} \cdot \Delta \quad \text{(EQUATION 17)}$$

where $\hat{f}_{ij}$ are coefficients of the inverse quantized transformed block $\hat{F}$. In the inverse transform, the core matrix and scale matrix is not the same as those in forward transform.

$$\hat{D}=C_b^T(\hat{F}\otimes Q_{back})C_b \quad \text{(EQUATION 18)}$$

where $C_b$ and $Q_{back}$ are defined as:

$$C_b = \begin{bmatrix} 1 & 1 & 1 & 1 \\ 1 & 1/2 & -1/2 & -1 \\ 1 & -1 & -1 & 1 \\ 1/2 & -1 & 1 & -1/2 \end{bmatrix}, Q_{back} = \begin{bmatrix} a^2 & ab & a^2 & ab \\ ab & b^2 & ab & b^2 \\ a^2 & ab & a^2 & ab \\ ab & b^2 & ab & b^2 \end{bmatrix},$$

In the H.264/AVC, scale transform and quantization are combined together to further reduce computational complexity.

$$z_{ij} = Q(f_{ij}^*) = \text{round}\left(\frac{f_{ij}^* \cdot q_{ij}}{\Delta}\right) \quad \text{(EQUATION 19)}$$

where $q_{ij}$ are the scale coefficients of the $Q_{forw}$ matrix and $f_{ij}^*$ are coefficients of the ICT transformed block F* using the ICT core matrix.

3.2 Fast Sum of Squared Difference Algorithm

As illustrated in the last section, the SSD(S,C) could be determined in transform domain using $\text{SSD}(F, \hat{F}) = \|F - \hat{F}\|_F^2$, so it is unnecessary to calculate the distortion using the reconstructed block C. The computation of DCT-transformed F is, however, much more complex than the ICT-transformed F* as the scale transform contains fractional coefficients. Thus, if we can build a bridge between $\text{SSD}(F, \hat{F})$ and F*, then we can skip the calculation of F and $\hat{F}$. In order to achieve this purpose, we rearrange the quantization and inverse quantization processes of $\hat{F}$ in terms of pre-scaled quantization and inverse quantization of F*. The coefficients of $\hat{F}$ can be expressed as:

$$\begin{aligned}\hat{f}_{ij} &= \Delta \cdot \text{round}\left(\frac{f_{ij}}{\Delta}\right) \quad \text{(EQUATION 20)}\\ &= \Delta \cdot \text{round}\left(\frac{f_{ij}^* \cdot q_{ij}}{\Delta}\right)\\ &= \Delta \cdot \text{round}\left(\frac{f_{ij}^*}{\Delta/q_{ij}}\right)\\ &= \frac{\Delta}{q_{ij}} \cdot \text{round}\left(\frac{f_{ij}^*}{\Delta/q_{ij}}\right) \cdot q_{ij}\\ &= \Delta_{ij} \cdot \text{round}\left(\frac{f_{ij}^*}{\Delta_{ij}}\right) \cdot q_{ij}\\ &= \hat{f}_{ij}^* \cdot q_{ij}\end{aligned}$$

where $\Delta_{ij} = \Delta/q_{ij} \cdot \Delta_{ij}$ is a quantization parameter and represents the scaled quantization step for ICT-transformed coefficients $f_{ij}^*$ of F*. The quantization steps are not equal for all coefficients of F* and the values of $\Delta_{ij}$ depend on both $\Delta$ and the coefficients $q_{ij}$ of $Q_{forw}$. The values of $\Delta_{ij}$ differ for different positions as shown in FIG. 3. In addition, the inverse quantization of the ICT-transformed coefficients is defined as:

$$\hat{f}_{ij}^* = Q^{-1}(Q(f_{ij}^*)) = \Delta_{ij} \cdot \text{round}(f_{ij}^*/\Delta_{ij}) \quad \text{(EQUATION 21)}$$

Based on this new relationship, we can reformulate the $\text{SSD}(F, \hat{F})$ in terms of ICT transformed coefficients $f_{ij}^*$ as:

$$\begin{aligned}\text{SSD}(F, \hat{F}) &= \|F - \hat{F}\|_F^2 \quad \text{(EQUATION 22)}\\ &= \sum_{i=0}^{N-1}\sum_{j=0}^{N-1}[f_{ij} - \hat{f}_{ij}]^2\\ &= \sum_{i=0}^{N-1}\sum_{j=0}^{N-1}[f_{ij}^* \cdot q_{ij} - Q^{-1}(Q(f_{ij}^*)) \cdot q_{ij}]^2\\ &= \sum_{i=0}^{N-1}\sum_{j=0}^{N-1}q_{ij}^2[f_{ij}^* - \hat{f}_{ij}^*]^2\end{aligned}$$

This equation indicates that $\text{SSD}(F, \hat{F})$ can be directly related to the quantization error of $f_{ij}^*$. Therefore, we can calculate $\text{SSD}(F, \hat{F})$ more easily as we do not need to obtain $f_{ij}$ and $\hat{f}_{ij}$. However, division and multiplication operations are required to perform the quantization and inverse quantization processes of $f_{ij}^*$. They are normally performed in the following operations:

$$z_{ij} = Q(f_{ij}^*) = \text{round}\left(\frac{f_{ij}^*}{\Delta_{ij}}\right) \quad \text{(EQUATION 23)}$$

$$\hat{f}_{ij}^* = Q^{-1}(Q(f_{ij}^*)) = z_{ij} \cdot \Delta_{ij} \quad \text{(EQUATION 24)}$$

In order to make use of the advantage given by Equation 22, we propose to use an iterative table-lookup method for simplifying the quantization process of $f_{ij}^*$; and computing of the SSD using $\hat{f}_{ij}^*$. Thus, the computationally intensive division and multiplication operations can be avoided.

3.3 Iterative Table-Lookup Quantization Process

Basically, the quantization process is to find the nearest quantization point as shown in FIG. 4. In FIG. 4, axis 200 represents the value of $f_{ij}^*$ and has quantization points 210, 220, 230, 240 and 250. Quantization points 210, 220, 230, 240 and 250 have quantized values of −2, −1, 0, 1 and 2 respectively and inverse quantized values of −2$\Delta_{ij}$, −$\Delta_{ij}$, 0, $\Delta_{ij}$ and 2$\Delta_{ij}$ respectively. Each quantization point is associated with a respective quantization sub-zone and all values of $f_{ij}^*$ in that sub-zone are given the quantized value and inverse quantized value corresponding to that quantization point.

So, for example, quantization sub-zone 212 is bounded by boundaries 213 and 214 (also referred to as boundary points). Values of $f_{ij}^*$ between those boundaries are given a quantized value $z_{ij}$ of −2 and an inverse quantized value of −2$\Delta_{ij}$. $f_{ij}^*$ shown in the diagram is in a sub-zone having boundaries 238 and 242 and a quantization point 240. Therefore $f_{ij}^*$ is given a quantized value of 1 and an inverse quantized value of $\Delta_{ij}$.

Example quantization sub zone boundaries and corresponding inverse quantized values are shown in FIG. 5. It will be appreciated that the value of the inverse quantized value depends on the (i,j) position of the coefficient as $\Delta_{ij}$ varies depending on the i,j position. This is a consequence of the scaling factors which vary for different regions in the block and are defined by the integer image transform and encoding standard used. The values of $\Delta_{ij}$ for different position regions for an ICT transform is given in FIG. 3.

The relation between $\Delta_{ij}$, quantization sub-zones and the inverse quantized values for an ICT transform is shown in the table of FIG. 6. Regarding the parameters listed in the table, Qstep is the quantization step, the "position regions" refer to the position of the coefficient $f_{ij}^*$ in terms of i and j and are given in FIG. 3, $q_{ij}$ is the scaling factor and $\Delta_{ij}$ is the quantization parameter which has been defined above. The look up table may contain some or all of the information shown in FIG. 6. It may also contain the quantized values $z_{ij}$ corresponding to each quantization sub zone.

A preferred embodiment of the invention proposes an iterative table-lookup quantization process to find $f_{ij}^*$ corresponding sub-zone by searching from the zero point towards positive axis direction by comparing the absolute value of $f_{ij}^*$ with boundary points held in the look up table until $f_{ij}^*$ is smaller than a certain boundary point.

After this iterative look up process, we can obtain the quantization value $z_{ij}$, which is equal to the number of comparison times. Besides, we can also get $\hat{f}_{ij}^*$ by multiplying $z_{ij}$ by a quantization parameter stored in the look up table or by referring directly to the look up table if the inverse quantized values are stored in the look table.

To use this approach, the boundary points of the quantization sub-zones and the inverse quantized values or the quantization parameter are generated in advance during an initial part of the encoding process and their values are stored in memory for table lookup. Thus, no extra computation is required in this quantization process for determining the quantization points and quantization sub-zones.

The overall rate-distortion cost computation process using this proposed iterative table-lookup quantization for FSSD computation can be summarized as:

Step 1: Compute the predicted block using inter or intra frame prediction: P

Step 2: Compute the residual (difference) block: D=S−P

Step 3: ICT transform the residual block: $F^*=ICT(D)=C_f D C_f^T$

Step 4: Set SSD=0 and for i=0 to N−1 and j=0 to N−1 determine the quantized coefficients $z_{ij}$ and the SSD by the following iterative table-lookup quantization process:

Step I: Set k=0 and if $f_{ij}^*<0$ then set sign=−1, otherwise sign=1.

Step II: If $|f_{ij}^*| \geq (k+0.5)\Delta_{ij}$, then k=k+1 and goto Step II;

Step III: Set $z_{ij}=$sign·k and $\hat{f}_{ij}^*=$sign k·$\Delta_{ij}$;

Step IV: SSD=SSD+$q_{ij}^2(f_{ij}^*-\hat{f}_{ij}^*)^2$; If not the last $f_{ij}^*$ coefficient, goto Step I.

Step 5: Entropy code of the Z to find the number of bits to encode the block: R=VLC(Z)

Step 6: Calculate the R-D cost: $J_{RD}$=SSD+λ·R

In the above procedures, we assume that the boundaries of quantization sub-zones (having values (k+0.5)$\Delta_{ij}$ for k=0, 1, 2, . . . ), the scaling factor or its square $q_{ij}^2$ and the quantization parameter $\Delta_{ij}$ for each position region of (i,j) are loaded in the encoder and stored in a look up table during the initial process. The above method has the advantage that arithmetic operations are avoided and only a simple comparison operation between $|f_{ij}^*|$ and boundary points is required. Therefore, it is very suitable for hardware implementation.

Figure 8:
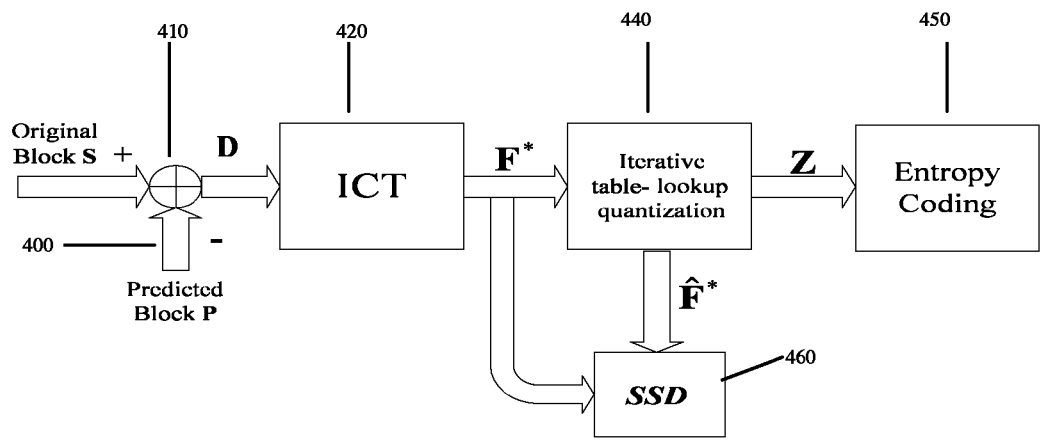
FIG. 8 is a schematic diagram showing a method of calculating an SSD according to a preferred embodiment of the present invention.

An overview of the conventional SSD(S,C) calculation is shown in FIG. 7 and contrasted with a preferred embodiment of the invention in FIG. 8.

In the conventional method in FIG. 7, a predicted block P is predicted from the source block S and the difference between the two is found in step 310 to produce a residual block D. The residual block D is integer image transformed in step 320 (e.g. by an ICT) to produce the transformed residual block F*. The block F* is scaled in step 330 and then quantized in a separate step 340 to produce a quantized transformed residual block Z. The block Z is entropy encoded in step 350 and the number of bits required to entropy encode the block is noted. In step 360 the block Z is inverse quantized to obtain inverse quantized residual block $\hat{F}$. The block $\hat{F}$ is then inverse scale transformed in step 370 and inverse integer image transformed in step 380 (by the reverse of the operation of step 320). This provides a reconstructed residual block $\hat{D}$. The original block is then reconstructed from the residual block using inter or intra prediction to arrive at reconstructed block C in step 340. The SSD between the source block S and the reconstructed block C is finally calculated in step 395. This gives a measure of the distortion caused by encoding the block.

In the preferred embodiment of the present invention shown in FIG. 8 the separate scaling, quantizing, inverse quantizing, inverse scaling, inverse integer image transform and block reconstruction steps 330, 340, 360, 370, 380 and 390 are eliminated and replaced with an iterative lookup table process 440.

Thus, in step 400 a predicted block P is predicted by intra or inter prediction from the original source block S. In step 410 the predicted block P is subtracted from the source block S to obtain a residual block D. In step 420 an integer image transform, for example an ICT, is performed on the residual block D to obtain an integer transformed residual block F* having coefficients $f_{ij}^*$. In step 440 a look up table is referred to iteratively to find the corresponding quantized coefficients $z_{ij}$ which make up the quantized transformed residual block Z. The values $\hat{f}_{ij}^*$ which make up a matrix $\hat{F}^*$ are then found either directly from the look up table or by multiplying the corresponding quantized coefficients $z_{ij}$ by quantization point values found in the look up table.

Thus compared to the conventional method, many processor intensive processes are avoided. Furthermore, as mentioned above, use of a look up table enables the quantization to be carried out by a simple comparison operation. This is computationally efficient as addition, subtraction, division or multiplication operations may be avoided or at least minimized. Some of the benefit is obtained by carrying out the SSD in the residual transform domain (which avoids the inverse transform and reconstruction operations), however it is thought the most significant reduction in processing time comes from use of the look up table to carry out the quantization and inverse quantization operations (the quantization operation is a pre-scaled quantization operation if the transform is an ICT).

Figure 9:
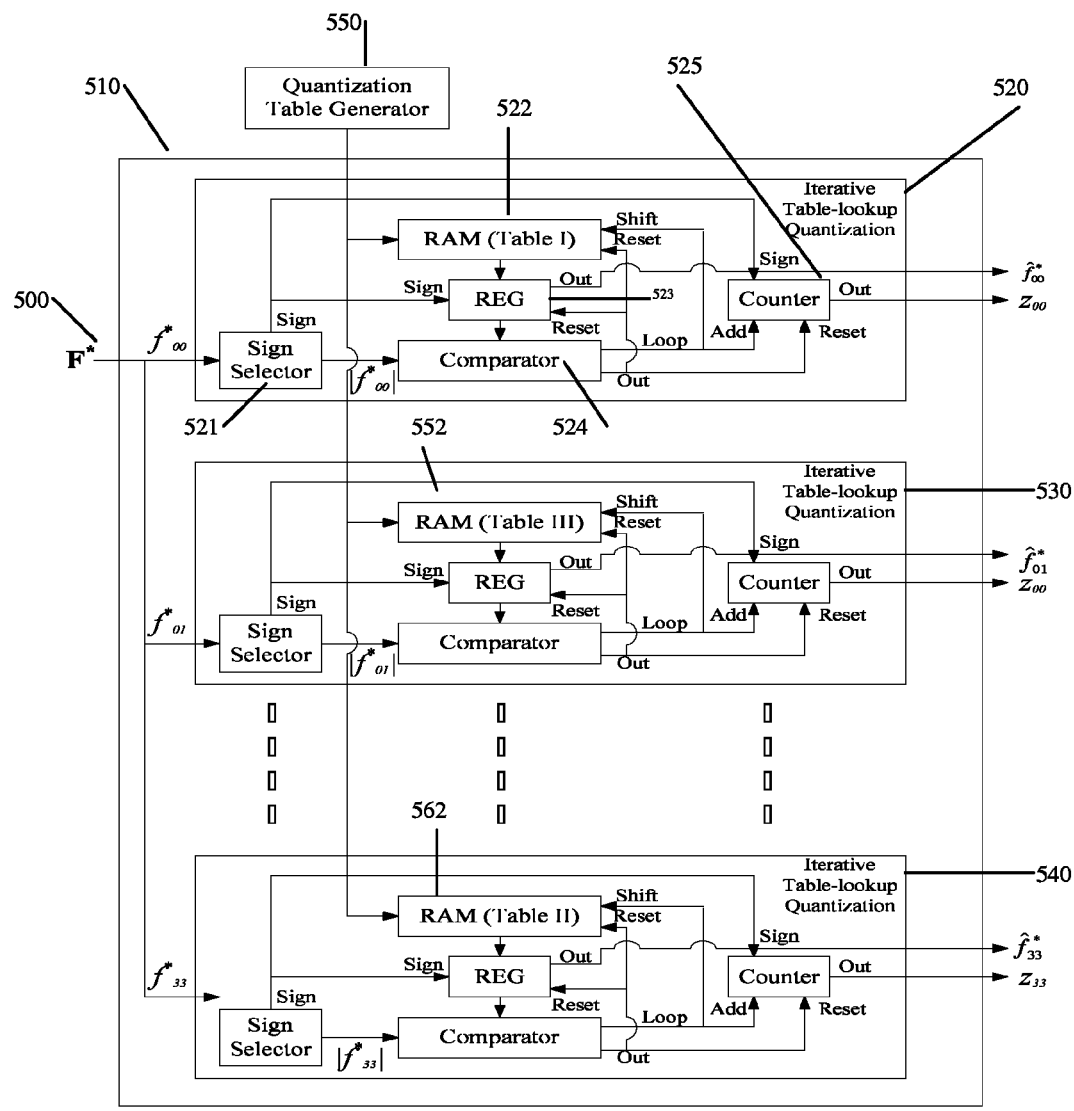
FIG. 9 shows a possible hardware implementation for carrying out an iterative table-lookup process to find quantized and inverse quantized coefficients.

FIG. 9 shows a possible hardware structure for carrying out the iterative table-lookup quantization process. Data 500 from an integer image transformed residual block F* is input to the hardware system 510. The data comprises all the coefficients $f_{ij}^*$ of the block. As each coefficient does not depend on the others, the quantization process can be performed in parallel. In the other words, all the inverse quantized coefficients $\hat{f}_{ij}^*$ are found simultaneously. Accordingly, each coefficient $\hat{f}_{ij}^*$ is input to a respective circuit 520, 530, 540 and the pre-scaled quantization and inverse quantization is carried out in parallel for each coefficient. FIG. 9 only shows in detail the circuits for calculating $\hat{f}_{00}^*$, $\hat{f}_{01}^*$ and $\hat{f}_{33}^*$, but it is to be understood there will be a similar circuit for each coefficient.

At the beginning of the encoding process, quantization table generator 550 generates a quantization table. The quantization table contains the boundary points of quantization sub zones for each (i,j) position region and the quantization point which each sub zone is associated with. For example, boundary points $\Delta/2a^2$, $3\Delta/2a^2$ and $5\Delta/2a^2$ and corresponding quantization points 0, 1, 2 respectively—see position region I in FIG. 6). The quantization point may be stored separately from the boundary point or alternatively inferred from the position in which the boundary point is stored in the table. The data from the quantization table is stored in the look up table 522, 552, 562 of each circuit 520, 530, 540. Alternatively each look up table may only contain the data relevant for that circuit's position region (so circuit 520 for calculating $\hat{f}_{00}^*$ has the data for position region I, the look up table of circuit 530 for calculating $\hat{f}_{01}^*$ has data for position region III and circuit 540 for calculating $\hat{f}_{33}^*$ has the data for position region II—see FIG. 3). It may also be possible for each circuit to refer to a single central look up table.

The particular position regions, quantization points and boundaries in the tables of FIGS. 3 and 6 are examples only and are determined by the ICT transform and the H.264/AVC standard. If another image or video encoding standard is used, then the tables will have different position regions, quantization points and boundaries which can easily be determined by consulting the encoding standard in question.

Operation of the circuit 520 will now be discussed in detail, it being understood that the other circuits 530, 540 etc operate in the same way.

The RAM 522 contains the look up table referred to above and a pointer that points to the current boundary point. The current boundary point is loaded in a register 523 and compared with $|f_{ij}*|$ after the sign of $f_{ij}*$ is abstracted by a sign selector device 521. If the comparator 524 judges that $|f_{ij}*|$ is larger than the current boundary point, then a 'Loop' signal signal is issued which tells counter 523 to increment its count by one and causes the pointer in RAM 522 to shift forward and point to the next boundary point in the look up table. This process continues until the comparator 524 finds $|f_{ij}*|$ that is smaller than the current boundary point. The comparator 524 then generates an 'Out' signal which resets the pointer to the initial position and causes the counter 525 to output its accumulated count (which is the quantized value $z_{ij}$). The 'Out' signal also causes the register to output the current inverse quantized value, $\hat{f}_{ij}*$ (which may be stored in the look up table or calculated at that moment, for example by multiplying the quantized value by a quantization parameter stored in the look up table). From the structure in FIG. 9, it can be seen that the proposed table-lookup quantization process is very suitable for hardware implementation, since it does not require complicated operation modules and can execute in parallel mode.

Figure 10:
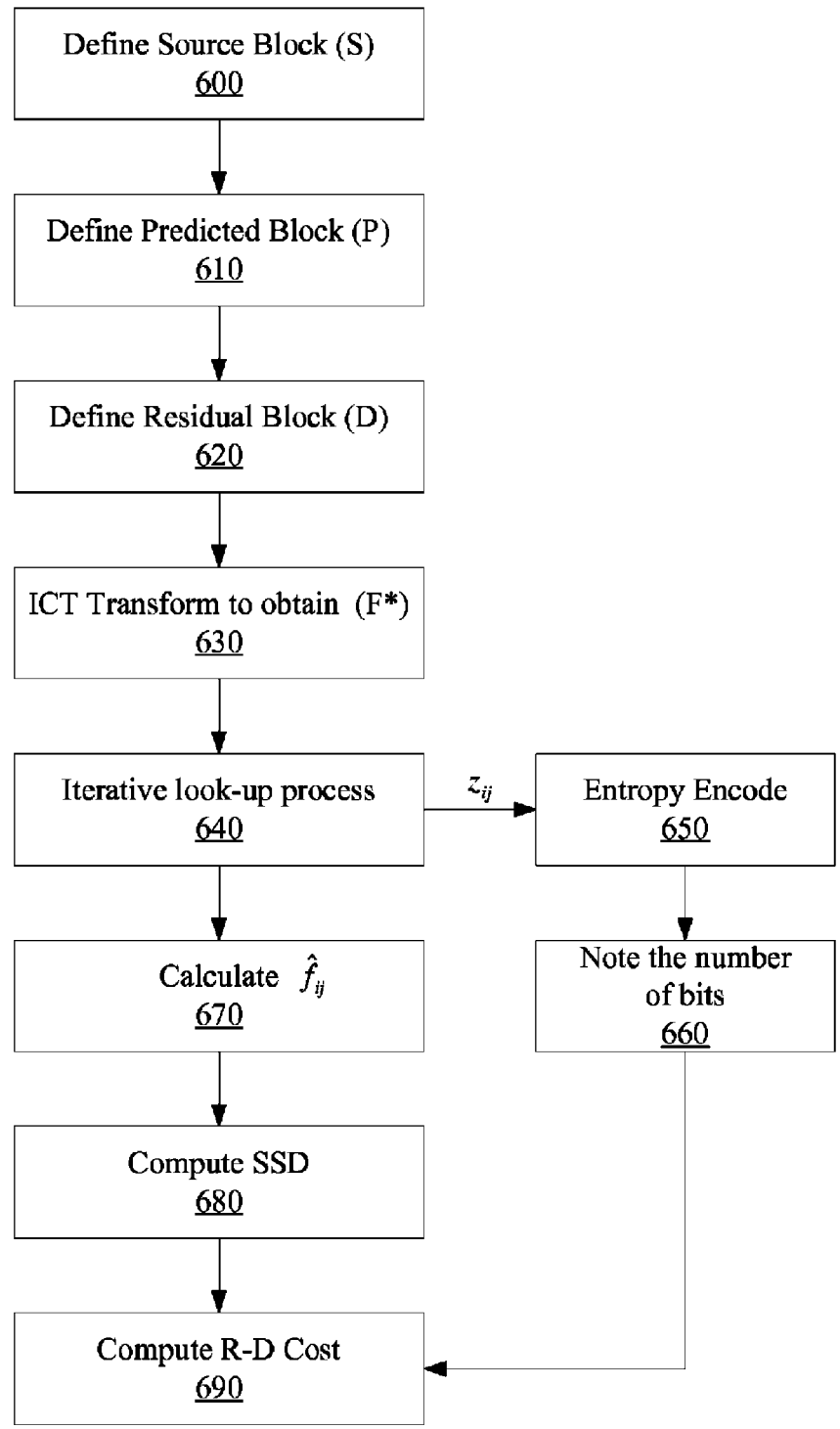
FIG. 10 is a flow diagram showing a preferred method of computing the rate-distortion cost of encoding a block.

A preferred embodiment of the present invention will now be described with reference to FIG. 10. In Step 600 a source block S of video or image data is defined or received by computing or image processing apparatus. In step 610 a predicted block P is predicted from the source block using inter or intra predicting according to a particular encoding mode (for example, one of the encoding modes allowed by the H.264/AVC standard). In step 620 a residual block is computed by subtracting the predicted block P from the source block S. In step 630 an integer image transform (e.g. an ICT) is performed on the residual block D to obtain a transformed residual block F* having a plurality of co-efficient $f_{ij}*$. In step 640 a look up table is referred to iteratively to carry out pre-scaled quantizing of the block F* to obtain the coefficient $z_{ij}$ of the quantized transformed residual block. In step 650 the quantized transformed residual block is entropy encoded and in step 660 the number of bits required to entropy encode the block are noted. In step 670 the inverse quantized coefficients are found by referring to the look up table. Preferably the inverse quantized coefficients will be stored in the look up table, however if they are not, then they could be found by multiplying the coefficient $z_{ij}$ by a corresponding pre-scaled quantization step $\Delta_{ij}$ held in the look up table.

In step 680 the sum of squared differences (SSD) between $f_{ij}*$ and $\hat{f}_{ij}*$ is computed. Preferably it is a weighted SSD, for example given by the equation $$SSD = \sum_{i=0}^{N-1}\sum_{j=0}^{N-1} q_{ij}^2 [f_{ij}^* - \hat{f}_{ij}^*]^2.$$

Steps 640, 650, 660 and 670 may be carried out in parallel for each of the i,j values. In step 690 the rate distortion is calculated from the SSD, which was computed in step 680, and the number of bits required to entropy encode the block, which was noted in step 660. The rate distortion may for example be calculated according to the equation $J_{RD}=SSD+\lambda \cdot R$; where $J_{RD}$ is the rate distortion, SSD is the sum of squared differences calculated in step 680, $\lambda$ is a Lagrange multiplier and R is the number of bits required to entropy encode the block.

Figure 11:
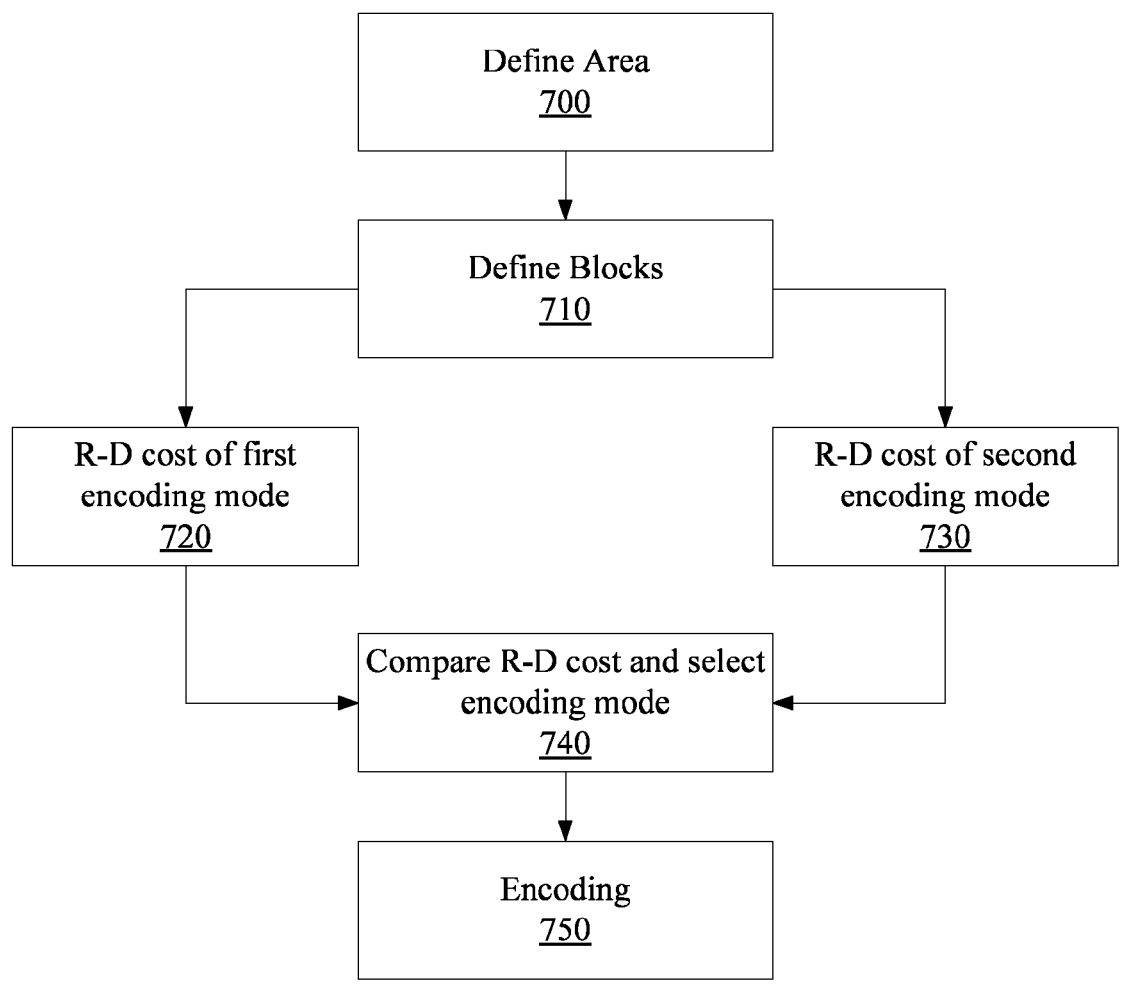
FIG. 11 is a flow diagram showing a preferred method of encoding an area in a frame of video or image data.

FIG. 11 illustrates a method of encoding video or image data according to a preferred embodiment of the present invention. In step 700 an area is defined in the video or image data. In step 710 one or more blocks (e.g. macroblocks) are defined in the area of image or video data. In step 720 the rate distortion caused by encoding the one or more blocks according to a first encoding mode is computed. For each block in the area the rate distortion (R-D cost) is determined by using the method of FIG. 10. The rate distortion of each of the blocks in the area is then added together to determine the rate distortion caused by encoding the area according to the first encoding mode. In step 730 the same procedure is carried out as in step 720, except for a second encoding mode. In step 740 the respective rate distortions caused by encoding the area according to the first and second encoding modes are compared. The encoding mode giving the lowest rate distortion is thus found. In step 750 the area is encoded according to the selected encoding mode (or alternatively the data which has already been encoded according to that mode in step 650 of FIG. 10 is output).

While FIG. 11 shows just two different encoding modes, it is possible for there to be three or more different encoding modes. In that case the rate distortion of each encoding mode may be computed separately, compared and the mode with the lowest rate distortion selected.

As mentioned above the area for which the rate-distortion is calculated may contain one or more blocks. The area may contain a different number of blocks according to the encoding mode used (i.e. the encoding mode determines the number and size of the blocks which the area is split into). However, as the rate-distortion for the entire area is computed (e.g. as the sum of the rate-distortion cost of all the blocks in the area), the rate-distortion of different encoding modes may be compared even if the different encoding modes produce different numbers and sizes of blocks.

Alternatively the area may just contain one block (e.g. one macroblock) in all the encoding modes. In that case the rate-distortion of the area according to a particular encoding mode is simply the rate-distortion of that block.

Figure 12:
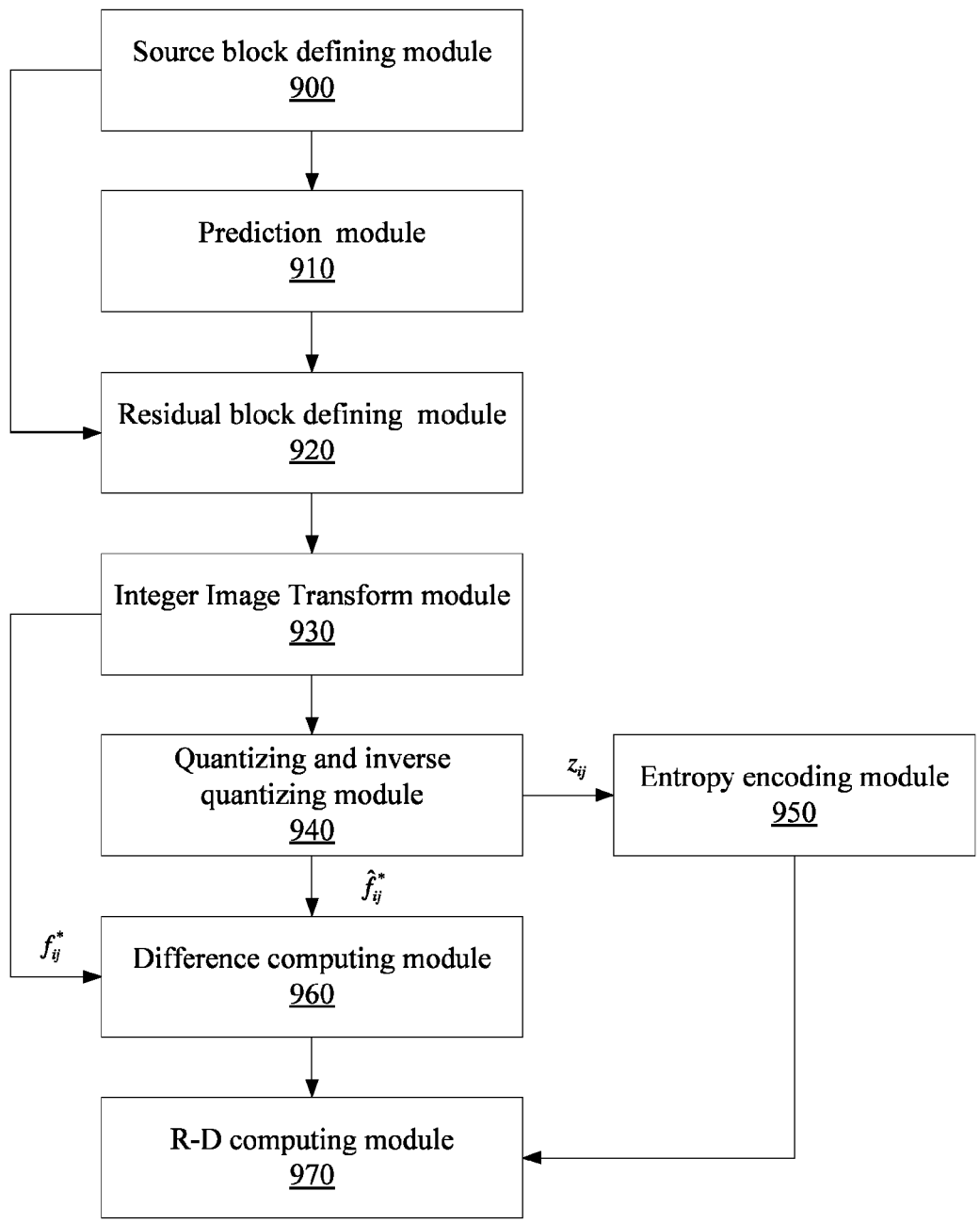
FIG. 12 is a block diagram showing a system for computing the rate-distortion cost of encoding a block.

FIG. 12 shows a system for computing the sum of squared differences between a source and reconstructed block of image or video data that is encoded by inter or intra prediction. It comprises a plurality of modules which may be software or hardware components.

Source block defining module 900 receives or defines a source block S in the image or video data. Prediction module 910 predicts a predicted block P based on the source block S using inter or intra prediction according to one of a plurality of possible block encoding modes. Residual block defining module 920 computes a residual block D by subtracting the predicted block P from the source block S. The residual block computed by the module 920 is then output to an integer image transform module 930 which performs an integer image transform (e.g. an ICT) on the residual block D in order to obtain a transformed residual block F*. A quantizating and inverse quantizing module 940 iteratively refers to a look up table in order to perform pre-scaled quantizing of the coefficients of the transformed residual block F* which produces a plurality of quantized coefficients $z_{ij}$. The module 940 also inverse quantizes the coefficients $z_{ij}$ to obtain inverse quantized coefficients $\hat{f}_{ij}*$. The coefficients $z_{ij}$ are output to an entropy encoding module 950 which entropy encodes the coefficients. Meanwhile a difference computing module 960 computes a weighted sum of squared differences (SSD) between $f_{ij}*$ and $\hat{f}_{ij}*$, using the coefficients $f_{ij}*$ of the block F* computed by module 930 and the coefficients $\hat{f}_{ij}*$ computed by module 940. A rate-distortion calculating module then calculates the rate distortion on the basis of the sum of squared differences output by modules 960 and the number of bits which module 950 required to entropy encode the coefficients $z_{ij}$.

Figure 13:
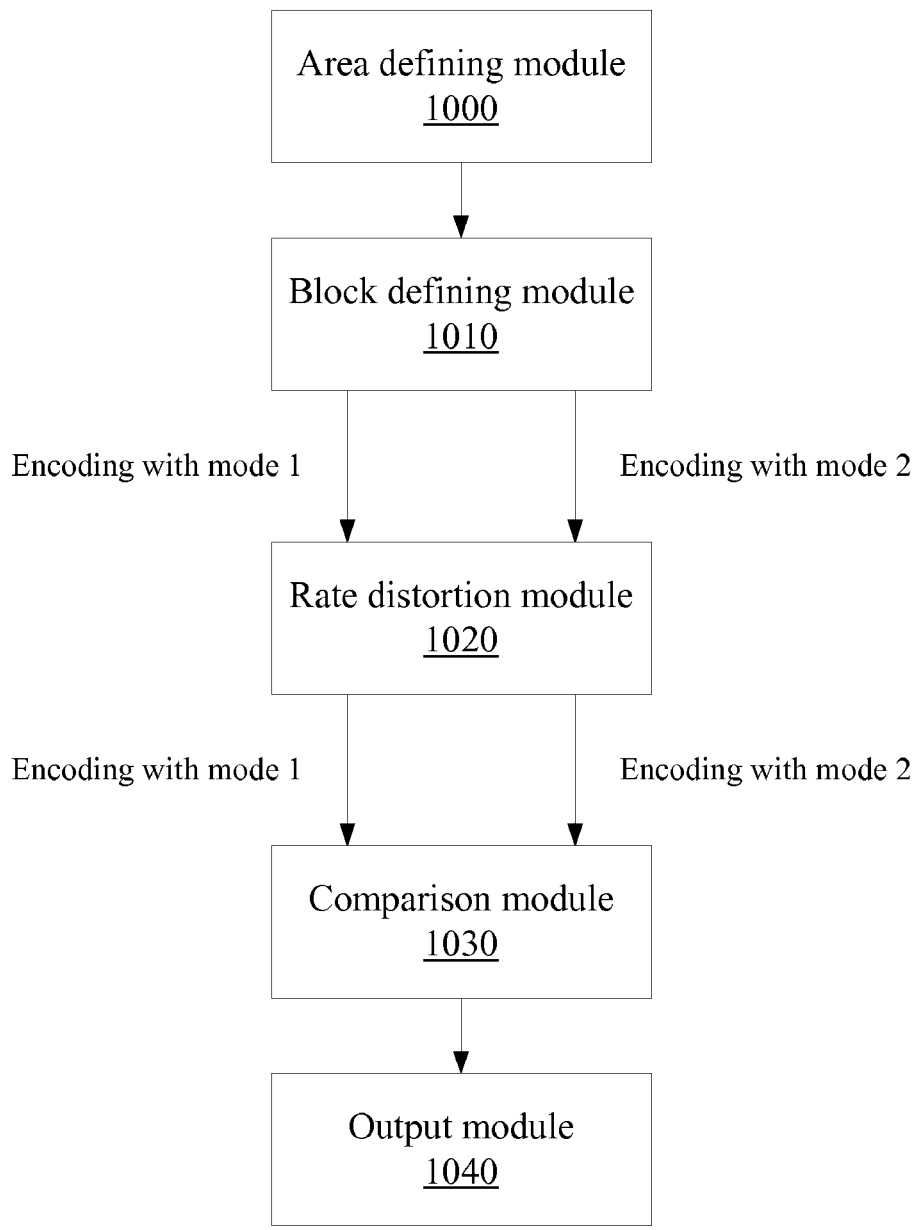
FIG. 13 is a block diagram showing a system for encoding an area in a frame of video or image data.

FIG. 13 shows a preferred embodiment of a system for encoding video or image data. The system has a plurality of modules, which may be software or hardware components. An area defining module 1000 defines an area in the video or image data which is to be encoded. A block defining module 1010 defines one or more blocks in said area in accordance with a first encoding mode. A rate distortion calculating module 1020 computes the rate distortion for each of the blocks encoded according to said first mode. The rate distortion calculating module 1020 may have a structure such as that shown in FIG. 12. The rate distortion module 1020 sums the rate distortion of the one or more blocks to find the total rate distortion for the area when it is encoded according to the first mode. The block defining and rate distortion modules 1010 and 1020 then carry out the same process but for a second encoding mode. The rate distortion of the area when encoded by the second encoding mode is thus found. The process may be repeated for one or more further encoding modes. A comparison module 1030 compares the rate distortion cost for each of the encoding modes (as computed by the module 1020) and selects one of the encoding modes to be used for encoding the data. For example the encoding mode with the lowest rate distortion cost may be chosen. Output module 1040 then outputs the encoded data which represents the area as encoded by the selected encoding mode. The output module 1040 may carry out the encoding itself, or alternatively read from a memory encoded data which was stored earlier in the process (for example the output of entropy encoding module 950 of FIG. 12).

Simulation Results

An embodiment of the invention using the proposed iterative table-lookup quantization processing and FSSD computation was tested using the first 100 frames from four video sequences (Akiyo, Foreman, Stefan and Container) all in QCIF format 176×144. They present different kinds of video sequences respectively: Akiyo (slow motion), Foreman and Container (medium motion), Stefan (high motion). The experiments were carried out in the JVT JM 8.3 encoder. Test parameters are listed below:

Test condition:
Rate Distortion Optimization is enabled;
CAVLC is enabled;
GOP structure is IPPPIPPP;
QP values are 28, 32, 36 and 40.

The percentage of reduced time of calculating distortion is defined as:

$$\Delta T_{SSD} = \frac{T_{orgTOT} - T_{proposedTOT}}{T_{orgTOT}} \times 100\% \quad \text{(EQUATION 25)}$$

where $T_{orgTOT}$ is the computation time of the original H.264/AVC encoder using conventional spatial-domain SSD (S,C) algorithm; while $T_{proposedTOT}$ is the computation time of a H.264/AVC encoder using the proposed FSSD computation method according to an embodiment of the present invention.

The tables in FIGS. 14-17 show the comparison of computation complexity between original JM encoder and an encoder using the proposed FSSD computation method. From the simulation results, we can conclude that the proposed FSSD computation method may reduce the encoding time by around 10% to 15% in different QP values. We estimate that about 4% to 7% reduction is achieved by the iterative table-lookup quantization process and 5% to 7% reduction is achieved by avoiding the inverse transform and pixel reconstruction. This was in a software simulation we expect that in a hardware implementation the reduction due to the look-up table process will be even greater.

The reduction in encoding time for the low motion sequence (Akiyo) was more than that for the high motion sequence (Stefan). A possible reason for this is that since the prediction accuracy of low motion sequence is better than that of high motion sequence, its residue is smaller and so less time is spent on the iterative table-lookup operation. FIG. 18 shows the average number of table-lookup operations for different video sequences in various QP values. The result indicates that the iterative table-lookup quantization process does not cost much time so that our proposed quantization method is practical. In addition, these experimental results are obtained using integer rounding precision in the computation of the equation 22 in the JM encoder. The rate-distortion performance comparison of the conventional SSD and proposed FSSD in terms of PSNR and bit-rate are shown in tables or FIGS. 19 to 22. These results show that the errors due to the clipping functions in computing the transform-domain SSD were small and the rate-distortion performance differences between these two methods was less than 0.1% and 0.03 dB in terms of bit-rate and PSNR, respectively.

Since the proposed FSSD computing method improved the computational efficiency of distortion measure with very little loss of rate-distortion performance, it could be combined with different types of H.264/AVC fast algorithms, such as fast inter/intra mode selection algorithms and rate estimation algorithm. Here, FSSD algorithm is combined with a conventional rate estimation method to reduce more computation complexity. The way to estimate the number of bits is:

$$\text{Total\_bits} = \alpha \cdot \text{total\_zeros} + \beta \cdot \text{total\_coeff} + \text{SAD} \quad \text{(EQUATION 26)}$$

where total_zeros and total_coeff present the number of zeros and the number of non-zero coefficients respectively after quantization. SAD is the sum of absolute value of quantized transform coefficients. The experiences values of $\alpha$ and $\beta$ are 1 and 3. Experimental results are listed in the tables in FIGS. 23 to 26. From the results, the reduction of encoding time was about 30% to 40% with ignorable performance degradation. This indicates that the proposed FSSD algorithm can be easily combined with other fast H.264/AVC algorithms and achieves a good tradeoff between computation complexity and rate-distortion performance.

What is claimed is:

1. A method for calculating the sum of squared differences between an original block S and a reconstructed block R of image or video data, the method comprising the steps of:
    (a) computing with a processor a predicted block P corresponding to the original block S, using inter or intra frame prediction,
    (b) calculating with the processor a residual block D from the original block S and the predicted block P, said residual block D having a plurality of coefficients,
    (c) applying with the processor an integer image transform to the coefficients of the residual block D so as to obtain a transformed residual block F*, said transformed residual block having a plurality of coefficients $f^*_{ij}$,
    (d) finding with the processor a plurality of coefficients $\hat{f}^*_{ij}$, the coefficients $\hat{f}^*_{ij}$ being defined by the equation $\hat{f}^*_{ij} = Q^{-1}(Q(f^*_{ij}))$, where Q is an operator which performs quantizing and $Q^{-1}$ is the inverse of the Q operator,
        wherein finding the coefficients comprises iteratively comparing the absolute value of each coefficient $f^*_{ij}$ of the transformed residual block to boundaries quantization sub-zones in a look up table, said boundaries of quantization sub-zones having progressively higher quantization point values, until said absolute value of said coefficient is lower than a quantization sub-zone boundary, and (e) computing with the processor a sum of squared differences between $f^*_{ij}$ and $\hat{f}^*_{ij}$.

2. A method according to claim 1, wherein the operator Q performs pre-scaled quantization.

3. A method according to claim 1, wherein the sum of squared differences (SSD) is calculated according to the equation $$SSD = \sum_{i=0}^{N-1} \sum_{j=0}^{N-1} q_{ij}^2 [f_{ij}^* - \hat{f}_{ij}^*]^2,$$

where $q_{ij}$ is a scaling factor which depends upon the values of i and j.

4. A method according to claim 1, wherein the iterative table-look up process is carried out in parallel for each coefficient $f_{ij}^*$ of the transformed residual block.

5. A method according to claim 1, wherein for each coefficient $f_{ij}^*$ of said transformed residual block, said quantization sub-zone boundaries and quantization point values, referred to in the look up table, depend on the position of the coefficient $f_{ij}^*$ in the transformed residual block.

6. A method according to claim 1, further comprising the step of quantizing the coefficients of the transformed residual block F*, to obtain a quantized transformed residual block Z.

7. A method according to claim 6, wherein the step of quantizing the coefficients is performed with the aid of a look up table.

8. A method according to claim 6, further comprising the step of entropy encoding the quantized transformed residual block Z.

9. A method of calculating the rate-distortion caused by encoding image or video data according to a first encoding mode, the method comprising carrying out the steps of claim 8, wherein in step (a) the predicted block is computed according to said first encoding mode, and wherein the rate-distortion is calculated based on the sum of squared differences computed in step (e) and on the number of bits required to entropy encode the quantized transformed residual block Z.

10. A method according to claim 9, wherein said rate-distortion is calculated by the formula $J_{RD}=SSD+\lambda \cdot R$, where $J_{RD}$ is a parameter representing the rate distortion, SSD is the sum of squared differences computed in step (e), R is the number of bits required to entropy encode the block, and $\lambda$ is a Lagrange multiplier.

11. A method of encoding video or image data, the method comprising the steps of:
defining an area in a frame of video or image data,
calculating the rate-distortion which would be caused by encoding said area according to a first encoding mode, said rate-distortion being calculated by using the method of claim 9,
comparing said rate-distortion with the rate-distortion which would be caused by encoding said area according to a second encoding mode,
selecting one of said first and second encoding modes on the basis of said comparison, and
encoding said data according to the selected encoding mode.

12. A method according to claim 11, wherein the encoding mode which will produce the lowest rate-distortion is selected.

13. A method of calculating the distortion caused by encoding image or video data according to a first encoding mode, the method comprising carrying out the steps of claim 1, wherein in step (a) the predicted block is computed according to said first encoding mode, and wherein the calculated distortion is based on the sum of squared differences computed in step (e).

14. A method according to claim 1, wherein said integer transform is an integer cosine transform.

15. A method for calculating the sum of squared differences between an original block S and a reconstructed block R of image or video data, the method comprising the steps of:

(a) computing with a processor a predicted block P corresponding to the original block S, using inter or intra frame prediction, (b) calculating with the processor a residual block D from the original block S and the predicted block P, said residual block D having a plurality of coefficients, (c) applying with the processor an image transform to the coefficients of the residual block D so as to obtain a transformed residual block F, said transformed residual block having a plurality of coefficients, (d) finding with the processor the coefficients of a first matrix $\hat{F}$, said first matrix being an inverse quantized transform of said residual block,
wherein finding the coefficients comprises iteratively comparing the absolute value of each coefficient of the first matrix to boundaries quantization sub-zones in a look up table, said boundaries of quantization sub-zones having progressively higher quantization point values, until said absolute value of said coefficient is lower than a quantization sub-zone boundary, and (e) computing with the processor the sum of squared differences between said transformed residual block F and said first matrix $\hat{F}$.

16. A method according to claim 15, further comprising the step of quantizing the coefficients of said transformed residual block F to obtain a quantized transformed residual block Z.

17. A system for calculating the sum of squared differences between an original block S and a reconstructed block R of image or video data; the system comprising:

a) a processor having a predicting module for predicting a predicted block P, corresponding to an original block of data S, by using inter or intra prediction, b) the processor also having a residual block defining module for calculating a residual block D, which is the difference between said predicted block P and said original block S, c) the processor further having a transform module for performing an integer image transform on said residual block D to obtain a transformed residual block F* having a plurality of co-efficients $f^*_{ij}$, d) the processor still further having an inverse quantization module for finding a plurality of coefficients $\hat{f}^*_{ij}$, the coefficients $\hat{f}^*_{ij}$ being defined by the equation $\hat{f}_{ij}=Q^{-1}(Q(f^*_{ij}))$, where Q is an operator which performs quantizing and $Q^{-1}$ is the inverse of the Q operator,
wherein the inverse quantization module finds the coefficients by iteratively comparing the absolute value of each coefficient $f^*_{ij}$ of the transformed residual block to boundaries quantization sub-zones in a look up table, said boundaries of quantization sub-zones having progressively higher quantization point values, until said absolute value of said coefficient is lower than a quantization sub-zone boundary, and e) the processor still further having a difference function computing module for computing a sum of squared differences between $f^*_{ij}$ and $\hat{f}^*_{ij}$.

18. A system according to claim 17, wherein the Q operator performs pre-scaled quantizing.

19. A system for encoding video or image data, the system comprising a system for calculating the sum of squared differences according to claim 17, wherein:

a) the processor still further has a block defining module for defining a first area in the video or image data, said area comprising one or more blocks of data;

b) the system according to claim 17 calculates the sum of squared differences between $f^*_{ij}$ and $\hat{f}^*_{ij}$ when a block of data in said area is encoded according to an encoding mode;

c) the processor still further has a quantizing module for carrying out quantizing of the coefficients of the transformed residual block $F^*$ to obtain a quantized transformed residual block Z;

d) the processor still further has an entropy encoding module for entropy encoding the quantized transformed residual block Z;

e) the processor still further has a rate-distortion calculating module for calculating the rate-distortion of an encoding mode, based on the number of bits required to entropy encode one or more blocks of data according to said encoding mode and the sum of squared differences between $f^*_{ij}$ and $\hat{f}^*_{ij}$ for one or more blocks of data encoded according to said encoding mode; and f) the processor still further has an encoding mode selection module for selecting an encoding mode for encoding the video or image data from a plurality of possible encoding modes, said module being arranged to select the encoding mode on the basis of a comparison of the respective rate-distortions of the possible encoding modes.

20. A system according to claim 19, wherein the quantizing module and inverse quantizing module are provided as a single module.

21. A non-transitory computer readable medium containing executable instructions stored thereon which, when executed, perform the following steps:

(a) computing a predicted block P corresponding to the original block S, using inter or intra frame prediction, (b) calculating a residual block D from the original block S and the predicted block P, said residual block D having a plurality of coefficients (c) applying an integer image transform to the coefficients of the residual block D so as to obtain a transformed residual block $F^*$, said transformed residual block having a plurality of coefficients $f^*_{ij}$ (d) finding a plurality of coefficients $\hat{f}^*_{ij}$, the coefficients $\hat{f}^*_{ij}$ being defined by the equation $\hat{f}^*_{ij}=Q^{-1}(Q(f^*_{ij}))$, where Q is an operator which performs quantizing and $Q^{-1}$ is the inverse of the Q operator, wherein finding the coefficients comprises iteratively comparing the absolute value of each coefficient $f^*_{ij}$ of the transformed residual block to boundaries quantization sub-zones in a look up table, said boundaries of quantization sub-zones having progressively higher quantization point values, until said absolute value of said coefficient is lower than a quantization sub-zone boundary, and (e) computing a sum of squared differences between $f^*_{ij}$ and $\hat{f}^*_{ij}$.

* * * * *